(12) United States Patent
Okitsu

(10) Patent No.: US 8,263,234 B2
(45) Date of Patent: *Sep. 11, 2012

(54) HIGH-STRENGTH STEEL SHEET, STRENGTH MEMBER FOR VEHICLES USING THE SAME, AND METHOD FOR PRODUCING STRENGTH MEMBER FOR VEHICLES

(75) Inventor: Yoshitaka Okitsu, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 66 days.

This patent is subject to a terminal disclaimer.

(21) Appl. No.: 12/746,663

(22) PCT Filed: Dec. 5, 2008

(86) PCT No.: PCT/JP2008/003633
§ 371 (c)(1),
(2), (4) Date: Aug. 4, 2010

(87) PCT Pub. No.: WO2009/072303
PCT Pub. Date: Jun. 11, 2009

(65) Prior Publication Data
US 2011/0008648 A1    Jan. 13, 2011

(30) Foreign Application Priority Data

Dec. 5, 2007 (JP) ................. 2007-314693
Dec. 5, 2007 (JP) ................. 2007-314734

(51) Int. Cl.
*B32B 15/00* (2006.01)

(52) U.S. Cl. .......... 428/683; 148/320; 148/504
(58) Field of Classification Search ........... 148/504, 148/320, 526; 428/683; 420/8
See application file for complete search history.

(56) References Cited

U.S. PATENT DOCUMENTS

| 2008/0131305 A1 | 6/2008 | Okitsu |
| 2009/0188589 A1 | 7/2009 | Okitsu |

FOREIGN PATENT DOCUMENTS

| JP | 62-182225 A | 8/1987 |
| JP | 07-188834 A | 7/1995 |
| JP | 2001-130444 A | 5/2001 |
| JP | 2002-105533 A | 4/2002 |
| JP | 2004-277858 A | 10/2004 |
| JP | 2006-161077 A | 6/2006 |
| JP | 2007-130685 A | 5/2007 |
| JP | 2007-321207 A | 12/2007 |

(Continued)

OTHER PUBLICATIONS

Supplementary European Search Report dated Jan. 4, 2011, issued in corresponding European Patent Application No. 08857650.9.

(Continued)

*Primary Examiner* — Jennifer McNeil
*Assistant Examiner* — Daniel J Schleis
(74) *Attorney, Agent, or Firm* — Westerman, Hattori, Daniels & Adrian, LLP

(57) ABSTRACT

A high-strength steel sheet includes a stress-strain diagram obtained by a tensile test of the steel, and a gradient of stress in the stress-strain diagram, wherein the gradient dσ/dε in 3 to 7% of true strain is 5000 MPa or more.

6 Claims, 18 Drawing Sheets

FOREIGN PATENT DOCUMENTS

| | | |
|---|---|---|
| WO | 2006/059653 A1 | 6/2006 |
| WO | WO2007138752 * | 6/2007 |
| WO | 2007/132436 A2 | 11/2007 |
| WO | 2007/138752 A1 | 12/2007 |

OTHER PUBLICATIONS

Song, R. et al.; "Improvement of the work hardening rate of ultrafine grained steels through second phase particles"; Scripta Materialia, vol. 52, Mar. 14, 2005, pp. 1075-1080, XP002614780, pp. 1076, paragraph 3, p. 1080.

Song R. et al.; "Mechanical properties of an ultrafine grained C-Mn steel processed by warm deformation and annealing"; Acta Materialia, vol. 53, Aug. 25, 2005, pp. 4881-4892, XP002614789, p. 4884, paragraph 3.2, p. 4886.

International Search Report of PCT/JP2008/003633, Mailing Date of Mar. 24, 2009.

* cited by examiner

HIGH-STRENGTH STEEL SHEET, STRENGTH MEMBER FOR VEHICLES USING THE SAME, AND METHOD FOR PRODUCING STRENGTH MEMBER FOR VEHICLES

TECHNICAL FIELD

The present invention relates to a high-strength steel sheet, which has high strength and high impact energy absorbing characteristics, and relates to a strength member for vehicles using the same, and relates to a method of producing the same to a higher degree.

BACKGROUND ART

Recently, requirements of improving crush safety of automobiles have been increased. For example, as a safety method for front crushing, a method in which a front frame is deformed and impact energy is absorbed while the interior of a passenger space has a high deformation resistance and is inhibited from deforming, thereby securing passenger space, has been thought to be effective. Amount of absorbed impact energy in the front frame are proportional to the product of deformation resistance and deformation stroke. If the impact energy is absorbed with a smaller deformation stroke, several advantages, such as improvement in driving performance by shortening of front overhang and reducing the weight of a vehicle body can be obtained. Therefore, recently, strength of a material (generally a steel sheet) for a front frame has been enhanced.

When a steel sheet for a front frame is greatly strengthened, the yield point of the sheet is enhanced, whereby initial resistance, which is generated at the moment when a vehicle body is involved in a crush, is enhanced. Therefore, it is required to ensure sufficient impact energy absorption while the initial resistance is limited to be as low as possible.

In general, when a steel sheet is highly strengthened and a part such as a front frame is compressed in an elongated direction, the shape of buckling of the front frame is unstable, and the deformation occurs not in the form of an accordion, but in a form that is bent. Absorption efficiency of impact energy is decreased if the deformation occurs in the form of bending and absorption of impact energy cannot be expected to increase even though the material is greatly strengthened. It is known that buckling of a highly strengthened steel sheet is unstable since work hardening properties of the steel sheet are reduced due to high strengthening thereof. That is, when a member buckles first in a longitudinal direction and work hardening of the material is high, the deformation propagates from the buckled portion to the circumference thereof, and then another portion buckles. As a result, buckling with an accordion shape is formed. On the other hand, when work hardening of the material is low, deformation may be concentrated at the first buckling portion, and the member may bend. In general, work hardening property is reduced when a steel sheet is greatly strengthened, thereby producing instability in buckling.

In order to solve such problems, shapes of parts may be designed to stably buckle. However, shapes of parts are limited because of the layout and design in an engine compartment, and shapes of parts cannot be realized as a designer would like. In such a situation, if characteristics of a material are optimized to achieve the objects, energy can be absorbed with no problem and the material can be greatly strengthened. Specifically, if a material with high strength, high yield strength, and high work hardening property is used, increase of initial reaction is inhibited and buckling is stable, thereby effectively absorbing impact energy.

A steel sheet having good crush properties for parts in a vehicle body is disclosed in Patent Reference 1. The steel sheet includes austenite, which forms martensite by strain induced transformation and has a work hardening index of 0.6 or more. Patent Reference 2 discloses a production method for a high-strength steel sheet having good ductility, the method includes hot rolling, cold rolling, and annealing steel containing 0.1 to 0.45% of C and 0.5 or more of Si under predetermined conditions, thereby yielding a steel sheet having a tensile strength of 82 to 113 kgf/mm$^2$, and 2500 kgf/mm$^2$ or more of tensile strength multiplied by elongation. Patent Reference 3 discloses a high-strength steel sheet which contains 0.1 to 0.4 wt % of C and increased amount of Mn with decreased amount of Si, and is subjected to annealing two times, and thereby a tensile strength is 811 to 1240 MPa with high ductility of 28000 MPa or more of tensile strength multiplied by elongation.

Patent Reference 1: Japanese Unexamined Patent Application Publication No. 2001-130444
Patent Reference 2: Japanese Unexamined Patent Application Publication No. 62-182225
Patent Reference 3: Japanese Unexamined Patent Application Publication No. 7-188834

DISCLOSURE OF THE INVENTION

Problem Solved by the Invention

Patent Reference 1 discloses Example "a" of an austenite stainless steel containing 19 weight % of Cr and 12.2 weight % of Ni, and Example "b" of an austenite stainless steel containing 18.3 weight % of Cr and 8.87 weight % of Ni. The inventors obtained a commercial material of SUS304L (austenite stainless steel) of which the composition is substantially the same as that of Example "b", and formed a tubular sample (see FIG. 10) in which the sheet material was bent into the shape of a hat (the shape of a flattened "D" in cross section), and performed a crush test (refer to examples below) with the sample. As a result, buckling in an accordion shape was stably formed; however, balance of initial resistance and amount of absorbed energy was substantially the same as that of the conventional steel.

Claim 2 of Patent Reference 1 recites that the work hardening index is 0.26 or more. However, according to the inventors' research, balance of initial resistance and amount of absorbed energy is not affected by only the work hardening index, that is, the "n value". The n value is an index "n" when the relationship between stress σ and strain ε is as shown in "σ=Kε$^n$", and the inventors pondered three questions about the n value.

First, the n value only defines a shape of the stress-strain diagram and does not define the amount of work hardening of a material, that is, an absolute value of the amount of increased stress. For example, although a milled steel sheet has a high n value, the absolute value of the amount of increased stress is not large. As mentioned below, the present invention was made based on the knowledge that an important factor for impact properties is not the n value but is the amount of increased stress, that is, the gradient of the stress-strain diagram.

Furthermore, when the n value is measured, the obtained n value disadvantageously varies according to the range of strain that is used for the measurement. For example, "page 99, Handbook for Difficulty of Press Forming, Third Edition (2007, Nikkan Kogyo Shimbunsha, edited by the Technology Workshop for Thin Steel Sheet Forming) mentions that the "n value in an ordinary material is not constant in deforming". However, the range of strain used for measuring an n value is not defined. On "page 99, Handbook for Difficulty of Press Forming, Third Edition", it is merely described that the amount of strain is often "5 to 15% or 10 to 20%" in an ordinary steel sheet. In "Japanese Industrial Standard (JIS) Z 2253, Method for Testing of Work Hardening Index in Thin Steel Sheet, 7. (1) Calculation of n value", it is described that the "range of strain used for calculation is decided according to the standard of the material. If there is no standard, it is decided according to agreement between the supplier and the recipient". However, there is no standard for the n value in "JIS G 3141, cold rolled steel sheet and strip" and "The Japan Iron and Steel League, JFSA-2001, cold rolled steel sheet and strip for automobiles".

Thus, comparing n values measured by several methods is not accurate for evaluation. Furthermore, the range of elastic deformation should be carefully considered in measuring an n value. In "JIS Z 2253, Method for Test of Work Hardening Index in Thin Steel Sheet", the gauge length L of an elongation system is used for definition of true strain E. According to this definition, true strain is calculated with displacement of the gauge length, whereby the true strain includes portions of elastic deformation. However, it is not appropriate to use strain including range of elastic deformation for calculating the work hardening index. It is not essential whether the range of elastic deformation is included or not in the case of the material with low yield point, such as milled steel sheets. However, since high-strength steel sheets used for a crushing member as in the present invention have high yield point compared to milled steel sheets, the difference between n values when the range of elastic deformation is included or not is important.

According to the above situation, the inventors have researched about an index that is convenient and clear for conditions of calculation other than the n value as a material factor affecting crushing properties of a member. As a result, the inventors have reached the conclusion that gradient $d\sigma/d\epsilon$ of true stress between 3 to 7% of true strain in a true-stress-true-strain diagram which is made by plastic strain without a range of elastic deformation is most effective. Therefore, the stress gradient $d\sigma/d\epsilon$ is an index for regulating characteristics of materials in the present invention. Details of methods for measurement will be explained later.

Although the steel sheet having a composite structure of ferrite and retained austenite disclosed in Patent Reference 2 has a balance of strength and ductility, Si must be added at a certain amount. Therefore, surface conditions of the sheet are deteriorated and the amount of C must be 0.36% to obtain a high strength of 1000 MPa or more. As a result, strength in spot welding is low, and the steel sheet is not suitable for a vehicle body that is assembled by spot welding. Patent Reference 3 discloses a production method for a high-strength steel sheet having good balance of strength and ductility with a low amount of Si. However, the production cost of the method is high since the steel requires annealing two times, and strength of spot welding is low since the amount of C is high.

The steel sheets disclosed in any of Patent References do not have characteristics to inhibit initial resistance and ensure absorption of energy. Under the above circumstances, a high-strength steel sheet that can inhibit initial resistance in crushing and ensure absorption of energy with a low amount of C is required.

Objects of the present invention are to provide high-strength steel sheets that have high strength, high ability to absorb impact energy, and sufficient weldability, a strength member for vehicles using the same, and a production method for strength members for vehicles.

Means for Solving the Problem

The inventors have researched characteristics of materials required to enhance absorption of energy while inhibiting initial resistance in members that are deformed in an axial direction in strength members for vehicles. As a result, the inventors have come to understand that initial resistance is proportional to the stress when the material is deformed at a rate of 3% and absorption of energy is proportional to the stress when the material is deformed at a rate of 7%. Based on this, the inventors have reached the conclusion that the stress when the material is deformed at rate of 3% should be limited to be as low as possible and the stress when the material is deformed at rate of 7% should be increased as much as possible to enhance absorption of energy while initial resistance is inhibited. That is, the inventors have reached the conclusion that a steel sheet having a large amount of increased stress, that is, a gradient of 3 to 7% in a stress-strain diagram, can have a balance of low initial resistance and high absorption energy that have not been obtained heretofore.

The present invention has been completed based on the above knowledge and provides a high-strength steel sheet including a stress-strain diagram obtained by a tensile test of the steel, and a gradient of stress in the stress-strain diagram, wherein the gradient $d\sigma/d\epsilon$ in 3 to 7% of true strain is 5000 MPa or more.

According to a preferred embodiment, the steel includes a metallic structure consisting of a ferrite phase and a hard second phase dispersed in the ferrite phase; the hard second phase in the metallic structure having an area ratio of 30 to 70%; and the ferrite, of which grain sizes are not more than 1.2 μm, having an area ratio of 15 to 90% in the ferrite phase, wherein ds is an average grain size of the ferrite of which grain sizes are not more than 1.2 μm, dL is an average grain size of ferrite of which grain sizes are more than 1.2 μm, and ds and dL satisfy the following equation (1):

$$dL/ds \geq 3 \tag{1}$$

The present invention also provides a strength member for a vehicle made from the above high-strength steel sheets.

As mentioned above, the present invention makes it essential that the gradient $d\sigma/d\epsilon$ of stress in the stress-strain diagram obtained by a tensile test in 3 to 7% of true strain be 5000 MPa or more so as to have high strength and absorption characteristics of impact energy obtained to a higher degree. Measuring methods for the gradient $d\sigma/d\epsilon$ of the stress-strain diagram, which shows the characteristics of the present invention, will be explained hereinafter.

A test piece is produced from a material, which is subjected to a tensile test. In this test, an extensometer may be used. When an extensometer is used, gauge length and load are measured in a tensile test and a nominal stress-strain diagram is obtained. Then, a component of elastic deformation is reduced from the strain in the nominal stress-strain diagram and the remainder is converted to plastic strain, and the relationship between true strain and true stress is obtained. True stress: $\sigma_3$ at 0.03 of true strain and true stress: $\sigma_7$ at 0.07 of true strain are obtained based on the relationship between obtained plastic true strain and true stress, and the gradient $d\sigma/d\epsilon$ of the stress-strain diagram is obtained based on the following equation, thereby obtaining the gradient of the stress-strain diagram defined by the present invention.

$$d\sigma/d\epsilon = (\sigma_7 - \sigma_3)/0.04$$

If an extensometer cannot be used because the test piece is small, displacement of a cross head and load are measured and a stress-displacement diagram is obtained, the straight portion in the rising portion of the stress-displacement diagram is considered to be an element of elastic deformation, which is reduced from the strain, thereby obtaining nominal plastic strain. Other parameters may be similarly obtained.

The inventors also have researched ultrafine crystal grains to obtain a high-strength steel sheet in which work hardening properties are greatly improved by a technique other than the above-mentioned conventional techniques. As a result, the inventors reached the conclusion that high work hardening properties which cannot be obtained in the conventional techniques can be obtained in spite of high strength by making a composite structure steel sheet containing ferrite as a matrix including ultrafine particles at predetermined percentages and a second phase consisting of one or more of martensite, bainite, and retained austenite at predetermined percentages.

The steel sheet as produced in the above manner has a gradient in a stress-strain diagram of 3 to 7% of true strain of 5000 MPa or more, which has not been able to be realized by conventional production methods for high-strength steel sheets. FIG. 1 shows nominal-stress-nominal-strain diagrams of a steel sheet of the present invention and a comparative steel sheet (Invented steel sheet 4 and Comparative steel sheet 7 in examples below), and FIG. 2 shows nominal-stress-nominal-strain diagrams of a steel sheet of the present invention and a comparative steel sheet (Invented steel sheet 12 and Comparative steel sheet 10 in examples below). The invention steel sheets in particular exhibited large work hardening properties at 10% or less of strain.

The reasons the structure including a ferrite phase of ultrafine particles and the hard second phase has high work hardening properties, which were not obtained in the conventional techniques, are not entirely clear. The inventors have the following opinions about this matter. FIG. 3 shows a bright field image of a film obtained from the invented steel sheet (Invented steel sheet 4 in the example described below). That is, a tensile test piece was made from the invented steel sheet such that the direction of tensile stress coincided with the rolling direction. After the tensile test, a film was obtained from a parallel portion of the tensile test piece such that the observation face was a cross section parallel to the tensile direction, that is, the rolling direction, and the film was observed by a transmission electron microscope (TEM). FIG. 4 is a schematic drawing of the field image. According to FIGS. 3 and 4, the dark portion as a whole is a hard second phase, and the relatively bright portion is ferrite of a matrix. Dislocations exist at very high density in the ferrite of the matrix. The dislocations do not form dislocation cell structures that are generally observed in a deformed metal structure.

FIG. 5 shows a bright field image of a film obtained from the invented steel sheet (Invented steel sheet 12 in an example described below). The film was obtained in the same manner as in the case of FIG. 3 and was observed by a transmission electron microscope (TEM). FIG. 6 is a schematic drawing of the field image. According to FIGS. 5 and 6, the relatively dark particles at the right upper portion and center lower portion are a hard second phase, and the relatively bright portion is ferrite of a matrix. Dislocations exist at very high density in the ferrite of the matrix. The dislocations do not form dislocation cell structures that are generally observed in a deformed metal structure.

Dislocation cells are formed by pile-up of dislocations caused by complementing and interwinding of the dislocations introduced by deformation, thereby arranging dislocations so as to lower the strain energy, and are composed of a high dislocation density portion called a dislocation wall and a relatively low dislocation density portion. The strain energy is reduced and internal stress is reduced by forming the dislocation cell, whereby external stress for deformation is lower than that in the case in which the dislocation cell is not formed. An example of a dislocation cell in iron is shown in FIG. 9. 47 of page 265 in "Revised Introduction of Metal Physics, Shigeyasu KODA, CORONA Publishing Ltd., 1973) The example is a case in which pure iron was tensilely deformed at an elongation of 18%, and shows that cells are elongated in a specific direction and distance between cells is about 1 µm. The distance between cells may be such a degree when steel is tensilely deformed.

When sizes of crystal particles forming a steel are generally the same as sizes of general dislocation cells or smaller, further dislocation cells cannot be formed. Therefore, dislocations introduced by working exist in the particles at high density, and mutual functions between dislocations are large, thereby increasing internal stress. Therefore, larger external stress is necessary than that in the case of forming the dislocation cell. This may be the reason why large work hardening is obtained in the present invention.

Functions under the mechanism based on dislocation with respect to the steel sheet of the present invention will be explained hereinafter. The metal structure of the high-strength steel sheet in the present invention is a composite structure steel sheet consisting of a matrix of ferrite and a hard second phase, the hard second phase in the metallic structure has an area ratio of 30 to 70%, and ultrafine ferrite particles, of which grain sizes are not more than 1.2 µm, have an area ratio of 15 to 90% in the ferrite.

The reason for the above limitation will be explained hereinafter. When the area ratio of ultrafine ferrite particles of which grain sizes are not more than 1.2 µm in the ferrite of the matrix is less than 15%, work hardening properties of a material are not improved very much. This is because a portion of coarse particles occupies large portions of the metallic structure, and the particles form a dislocation cell as in the general manner. On the other hand, when the area ratio of ultrafine ferrite particles of which grain sizes are not more than 1.2 µm in the ferrite of the matrix is more than 90%, deformation properties of the ferrite phase are reduced and breakage of the material easily occurs. Stress concentration in the ultrafine ferrite particles is dispersed by containing certain amounts of the coarse particles of ferrite, and elongation of the material is improved. Therefore, the suitable area ratio of the ultrafine ferrite particles is 15 to 90%. In addition, in order to obtain the above-mentioned effects sufficiently, the average grain size of the ferrite particles of which the grain size is more than 1.2 µm is preferably three times the average grain size or more of the average grain size of the ultrafine ferrite particles.

The reason for the limitation of the area ratio for the hard second phase is explained hereinafter. When the area ratio of the hard second phase is less than 30%, large work hardening cannot be obtained even if the percentage of the ultrafine particles is in the predetermined range. The function of the hard second phase is to leadingly deform the adjoining soft ferrite and introduce large amounts of strain, that is, dislocation into the ferrite phase, thereby work hardening the ferrite of the matrix. If the amount of the second phase is small, such an effect is not sufficient and work hardening of the ferrite is not sufficient.

On the other hand, although the hard second phase is deformed to a certain extent to maintain a series of the metallic structure, primary deformation occurs in the ferrite. Therefore, when the area ratio of the hard second particles is greater than 70%, deformation of the material cannot be covered by only the ferrite of the matrix, and a certain part of the deformation may be covered by deformation of the hard second phase. However, the hard second phase is one of martensite, retained austenite, and bainite, which are hard and not easily deformed, whereby improvement of ductility is not expected even though strength of the material is enhanced. Retained austenite is deformed to a certain extent. However, after austenite is transformed to martensite by strain induced transformation, the hardness is high and ductility is low. If such a phase is the main portion of the deformation, voids are easily formed in an inner portion of the hard second phase or an interface between the hard second phase and the ferrite, whereby the material may be broken in an early stage. Therefore, the upper limit of the area ratio of the hard second phase is 70% in the present invention.

The area ratio of the hard second phase in a general composite structure steel sheet may be up to about 30%, which is different from the range of the hard second phase in the present invention. The reason the area ratio of the hard second phase in the conventional technique is up to 30% is not clear, but it is assumed to relate to movable dislocation density in the ultrafine ferrite particles. In research on steel consisting of single ultrafine ferrite particles without a second phase, it has been disclosed that dislocation density in a crystal particle is very small (for example, page 893 of Scripta Materiallia, Vol. 47, 2002).

Yield strength of steel closely relates to movable dislocation density. As explained by the yield theory of Gilman-Johnston, large external stress for yield of a material is required if initial movable dislocation density is small. When the material once yields and movable dislocation density greatly increases by multiplication of dislocations, deformation resistance decreases since large external stress is not required. Therefore, in this case, the material has characteristics in which the yield point is high and the work hardening properties are low. In order to avoid such a defect, and to decrease the yield point and enhance work hardening properties, initial movable dislocation density must be enhanced. A typical example of such steel is a composite structure steel sheet consisting of ferrite and martensite. In the composite structure steel sheet, since the lattice constants of the ferrite phase and the martensite phase are different from each other, misfits of the lattice are formed. In order to compensate for the misfits, dislocations having relatively high density exist at interfaces of the phases. These dislocations easily move when stress is applied to the material, and large stress is not required for yielding of the material.

Although the steel sheet of the present invention is made based on the composite structure, the matrix contains ultrafine particles in a predetermined range, whereby the present invention is completely different from the conventional steel sheet. In the high-strength steel sheet of the present invention, the initial movable dislocation density is assumed to be small as mentioned above compared to the ordinary steel sheet with coarse particles. Therefore, when a composite structure includes a structure of ultrafine particles as a matrix, the amount of the second phase must be large compared to the ordinary steel sheet with coarse particles to obtain sufficient initial movable dislocation density. Therefore, the amount of the second phase in the present invention is greater than that of the ordinary composite structure steel with coarse particles as a matrix.

The present invention provides a strength member for a vehicle, in which the high-strength steel sheets are bonded to each other by electric resistance welding, laser welding, or arc welding.

As a factor affecting welding properties, not only the amount of C, but also the carbon equivalent for which effects of other elements are considered, should be used. In the present invention, carbon equivalent (Ceq) for which Si, Mn, P, S(C+Mn/20+Si/40+4P+2S) are considered is used. The Ceq in the equation is known as a factor affecting a shape of breakage in a spot welding nugget as described on "page 38 of Technical Report of Japan Steel, vol. 385, October 2006". However, the Ceq substantially relates to notch sensitivity of a welding nugget, and is a factor for deciding whether the breakage occurred in a welding nugget or in a matrix. Therefore, the Ceq can be used to valuate the form of breakage in melting connection methods such as laser welding and arc welding.

In a high-strength steel sheet of the present invention, toughness of a welding nugget formed by spot welding is deteriorated when the C equivalence is high, and breakage may occur in a welding nugget when a welded joint is deformed, thereby deteriorating the weld strength. In order to solve this problem, the inventors have researched with respect to a spot resistance welded joint that can inhibit breakage in a nugget and have high welding strength in a steel sheet with a high C equivalence. As a result, the inventors have found that if hardness of the center of a welding nugget is 600 or less in Vickers hardness or the diameter of a heat-affected zone is three times the diameter of a welding nugget in a steel sheet with a high C equivalence, the problem can be solved.

The strength member for a vehicle of the present invention has been made based on the above knowledge, the strength member is characterized in that the alloying elements contained in steel satisfy the following equation (2), the high-strength steel sheets are bonded to each other by spot resistance welding, a welding nugget is formed at a connecting portion of the high-strength steel sheets by a spot resistance welding, and Vickers hardness of the center portion of the welding nugget is 600 or less.

$$Ceq=C+Mn/20+Si/40+4P+2S \geq 0.4 \qquad (2)$$

Another strength member for a vehicle of the present invention is characterized in that the alloying elements contained in steel satisfy the following equation (2), the elements contained in steel satisfy the following equation (2), and the high-strength steel sheets are bonded to each other by spot resistance welding, a welding nugget and a heat-affected zone are formed at a connecting portion of the high-strength steel sheets by spot resistance welding, and the diameter of the heat-affected zone is 1.6 times or more the diameter of the welding nugget.

$$Ceq=C+Mn/20+Si/40+4P+2S \geq 0.4 \qquad (2)$$

The reasons for the limitation of the hardness of the welding nugget and the diameter of the heat-affected zone are explained hereinafter. Regarding the hardness of the welding nugget, martensite transformation is not avoidable in a welding nugget when cooling after welding in a steel sheet of the present invention having high C equivalent. Martensite does not have good ductility and tendency to have scare toughness is well known, the strength of a welded joint may be deteriorated. The inventors have found that toughness of the nugget is not much decreased and can maintain itself in an impact deformation if hardness of a welding nugget of carbon steel is 600 or more in Vickers hardness.

According to the above knowledge, the inventors limited the above hardness of a welding nugget so as not to decrease the strength of a welded joint. In the range of the C equivalent in the present invention, it is difficult to set Vickers hardness to 600 or less in ordinary conditions of spot welding. However, Vickers hardness can be 600 or less by performing temper energizing with proper conditions after melt welding.

Next, the welding conditions to set hardness of a welding nugget to 600 or less of Vickers hardness are explained hereinafter. Hardness of quenched carbon steel is proportional to amount of carbon, and hardness of the steel sheet in the present invention containing 0.4 wt % exceeds a Vickers hardness of 600. Therefore, in order to reduce the hardness to the predetermined level, it is required to temper the nugget portion by energizing again after the connection welding in the spot welding. In this case, it is known that toughness of the nugget portion is reduced if tempering conditions are not proper. For example, it is described on "page 102, Chapter 4, Modern Metallurgical Material, Steel Material, edited by The Japan Institute of Metals" that alloy steels containing alloying elements such as Ni, Si, Cr, and Mn are brittle if the alloy steels are tempered at around 500° C. The steel sheet of the present invention contains the above alloying elements and is tempered at a predetermined temperature, so that tempering brittleness is taken into consideration.

Therefore, the tempering temperature, that is, the temperature which a nugget portion reaches in the temper energizing, must avoid the range of 450 to 550° C. When a steel sheet is heated to a high temperature while avoiding the tempering brittleness temperature, the temperature of the nugget portion easily exceeds transformation point $A_1$ of a steel sheet. In the steel sheet of the present invention, the transformation point $A_1$ is intentionally lowered, whereby problems of high temperature tempering are essential compared to the conventional steel sheets. Therefore, in order to stably temper a welding nugget, the tempering must be performed at a temperature range lower than the tempering brittleness temperature. However, since effects of tempering are insufficient if the temperature is too low, the amount of heat input must be controlled in a proper range.

In actual welding, it is difficult to directly measure the temperature of the nugget in tempering, so that conditions of energizing are set in the present invention. The inventors have performed experiments in which current values and energizing time in the tempering energizing are systematically varied. As a result, the inventors have found that the temperature which a nugget portion reaches is decided by the product of energizing current to the second power and energizing time to the 0.5 power and that welding strength is also decided by the parameter, and they have shown the proper range of the parameter in which the maximum welding strength is obtained.

Specifically, the energizing condition is that current: I(kA) and welding time: t(seconds) satisfy "$20 \leq I^2 \times t^{0.5} \leq 40$". If the value of the parameter is less than 20, sufficient effects of tempering cannot be obtained. On the other hand, if the value of the parameter exceeds 40, tempering brittleness occurs or a quenched structure is formed again since the temperature exceeds transformation temperature $A_1$ in temper energizing. In any case, the welding strength cannot be improved. Therefore, the production method for the strength member for a vehicle of the present invention is characterized in that the spot resistance welding is performed by connecting welding followed by tempering energizing performed under the following conditions.

current: I(kA)

welding time: t(seconds), wherein I and t satisfy "$20 \leq I^2 \times t^{0.5} \leq 40$"

Next, the reason the diameter of the heat-affected zone is 1.6 times or more the diameter of the welding nugget is explained. The heat-affected zone in the present invention can be observed in the following manner. That is, a joint portion formed by spot welding is cut along a cross section passing through the center of the nugget to form a test piece. The test piece is embedded into a resin and the cross section is polished, and the cross section is etched with picric acid. Then, the cross section is observed by a stereo microscope or light microscope and an image is obtained, whereby the heat-affected zone is discriminated by the etching grade.

When the diameter of the heat-affected zone (HAZ) formed around a connecting portion connected by spot welding is 1.6 times or more the diameter of the welding nugget, welding strength is improved. The reason for this is based on the following principle. As shown in FIG. 7A, if the region of the HAZ around the nugget is relatively small, a crack is easily transmitted from the interface of the steel sheet, in which stress is concentrated, into an inner portion of the nugget which is low in toughness when a shearing force is exerted on the connected steel sheets.

On the other hand, as shown in FIG. 7B, if the HAZ is large, the form of deformation of the steel sheet to which stress is exerted is slow with large radius of curvature since hardness of the HAZ is higher than that of the matrix. Therefore, stress concentration at the nugget is eased, whereby the nugget is not easily broken and crack is easily transmitted to an inner portion of the HAZ or an interface of the HAZ and the matrix. This means deformation of the matrix having good toughness is expected and the maximum load when the joint is broken can be enhanced. In the present invention, the diameter of the HAZ is 1.6 times or more the diameter of the welding nugget based on results of the examples, described below, to inhibit transmission of a crack into an inner portion of the nugget when stress is exerted and yields high welding strength by receiving the stress by the HAZ and the matrix.

Next, conditions for welding to realize the limitation in which the diameter of the HAZ is 1.6 times or more the diameter of the welding nugget will be explained. The inventors have researched effects of welding conditions with respect to the size of the HAZ. As a result, the inventors found that the diameter of the HAZ can be very large with not significantly enlarging the diameter of the nugget by setting an energizing time to a long time, which was not adopted in the conventional techniques. That is, if the energizing time is 0.5 seconds or more, the diameter of the HAZ can be 1.6 times or more the diameter of the welding nugget.

Although the reason the heat-affected zone is enlarged by setting the energizing time to be long is not clear, the following is the inventors' opinion. That is, overlapped portions of steel sheets are heated from the start of energizing, and the temperature of the steel sheets reaches or exceeds the melting point, whereby melting connecting occurs. In this condition, electrical resistance at the interface of the steel sheet is greatly reduced when the steel sheets are once connected, and the amount of heat is reduced since the current value is constant. Therefore, the size of the welding nugget is not enlarged over a certain extent, and heat is diffused into the matrix. As a result, the nugget is not enlarged and only the HAZ is enlarged. In some cases, solidification may be accomplished during energizing. In this case, since the electric resistance of the solidified nugget is lower than the initial condition, heat for melting the nugget is not generated, thereby enlarging the heat-affected zone. If the energizing time is too long, production efficiency is reduced and improvement of welding strength is saturated. Therefore, the upper limit of the energizing time is preferably 2.5 seconds.

Although the present invention limits the Vickers hardness of the center portion of the weld nugget formed by spot welding to 600 or less, or the diameter of the heat-affected zone formed by spot welding around the connecting portion is 1.6 times or more the diameter of the welding nugget, these conditions can both be satisfied in the present invention. In this case, the synergistic effects of the conditions can be obtained and the welding strength may be further improved.

Effects of the Invention

According to the present invention, since the gradient $d\sigma/d\varepsilon$ in 3 to 7% of true strain on a stress-strain diagram obtained by a tensile test is 5000 MPa or more, crushing with stable buckling shape caused by great improvement in work hardening properties can be obtained. Therefore, high strength and high absorption characteristics for impact energy are obtained to a greater degree, whereby high-strength steel sheets having superior impact resistance properties can be provided. Since the present invention has such properties, when the steel sheet is used as a strength member for a vehicle, great reduction in weight by thinning of the member, and great reduction in fuel consumption caused by the reduction in weight can be obtained, thereby greatly contributing to the reduction of exhaust $CO_2$ gas. The high-strength steel sheet of the present invention having relatively high C equivalent is suitable for forming a strength member by connecting with spot welding, and the strength member is very suitable for a vehicle since good weldability is ensured.

BEST MODE FOR CARRYING OUT THE INVENTION

Figure 1:
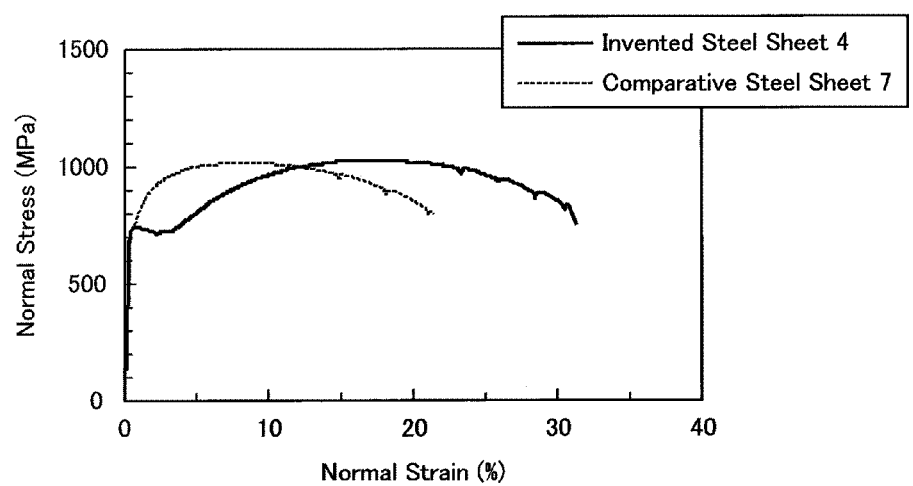
FIG. 1 shows nominal-stress-nominal-strain diagrams of the invented steel sheet and the comparative steel sheet produced in the example.

The high-strength steel sheet of the present invention has a composite structure consisting of ferrite of a matrix and a hard second phase, and can be produced from a composition of a common ferrite steel with low alloying elements. As previously mentioned, the composition of the present invention is limited by the equations.

Steel having a predetermined composition can be industrially ingoted by a converter or an electric furnace and experimentally ingoted by vacuum melting or atmosphere melting.

In casting steel, ingot casting by a batch type furnace can be used and continuous casting can be used because of high production efficiency. Produced slabs or ingots are rolled by a continuous hot rolling mill for sheets into a hot rolled sheet. Cooling patterns after rolling and winding temperature of a sheet are appropriately controlled according to composition, thereby forming a composite structure of ferrite and a hard second phase. The hot rolled coil obtained in the above manner is subjected to pickling to remove oxidized scale and is subjected to cold rolling. The reduction of the cold rolling is controlled in a proper range according to the distance between the hard second particles in the hot rolled sheet. Then, the cold rolled sheet is annealed by several methods such as continuous annealing and box annealing, and skin pass rolling for straightening is performed if necessary, thereby yielding a product.

The high-strength steel sheet of the present invention having a composite structure of ultrafine particles can be produced by optimization of the structure of the material in the middle process and the conditions of the process without change of the conventional production process for steel sheets.

EXAMPLES

Next, examples of the high-strength steel sheet will be explained. Steel sheets in the examples were experimentally produced. Therefore, apparatuses for vacuum melting, rolling, anneal, and the like are smaller than those for mass production. However, the results in the examples do not restrict production by apparatuses for mass production.

Example 1

In Example 1, an example of a steel sheet having relatively low C equivalent of less than 0.4 is explained. Slabs 1 to 8 were ingoted by vacuum melting. Compositions of the Slabs 1 to 8 are shown in Table 1. The balance other than the elements shown in Table 1 is Fe.

TABLE 1

| | Composition (wt %) | | | | | | | | | | | | | | | Ceq Base < 0.4 |
|---|---|---|---|---|---|---|---|---|---|---|---|---|---|---|---|---|
| | C | Si | Mn | P | S | Al | Nb | Ti | Ni | Cr | Mo | V | B | N | |
| Slab 1 | 0.11 | 0.018 | 3.0 | 0.02 | 0.002 | 0.02 | 0.05 | 0.002 | 0.01 | 0.54 | 0.01 | 0.01 | 0.0002 | 0.003 | 0.272 |
| Slab 2 | 0.15 | 0.02 | 2.5 | 0.004 | 0.004 | 0.02 | 0.02 | 0.014 | 1.98 | | 0.15 | | 0.0002 | 0.021 | 0.300 |
| Slab 3 | 0.14 | 0.02 | 2.4 | 0.005 | 0.002 | 0.02 | 0.02 | 0.012 | 4.97 | | 0.15 | | 0.0002 | 0.021 | 0.285 |
| Slab 4 | 0.20 | 0.01 | 3.0 | 0.003 | 0.003 | 0.03 | 0.05 | 0.002 | 0.01 | 0.01 | 0.01 | 0.01 | 0.0001 | 0.003 | 0.368 |
| Slab 5 | 0.20 | 0.01 | 3.0 | 0.003 | 0.003 | 0.03 | 0.05 | 0.002 | 0.01 | 0.01 | 0.01 | 0.01 | 0.0001 | 0.003 | 0.368 |
| Slab 6 | 0.21 | 0.02 | 3.0 | 0.004 | 0.004 | 0.01 | 0.05 | 0.002 | 1.96 | | | | | 0.003 | 0.385 |
| Slab 7 | 0.21 | 1.4 | 1.6 | 0.004 | 0.002 | 0.01 | 0.02 | 0.002 | 1.99 | | | | | 0.002 | 0.345 |
| Slab 8 | 0.19 | 1.5 | 1.5 | 0.005 | 0.0014 | 0.04 | 0.00 | | | | | | | 0.002 | 0.325 |
| Commercial Material 1 | 0.09 | 0.0 | 1.3 | 0.012 | 0.0046 | | | | | | | | | | 0.131 |
| Commercial Material 2 | 0.09 | 0.8 | 1.6 | 0.009 | 0.0022 | 0.04 | 0.001 | 0.001 | 0.01 | 0.02 | 0.01 | 0.01 | 0.0002 | 0.003 | 0.149 |
| Commercial Material 3 | 0.12 | 1.3 | 1.5 | 0.008 | 0.0025 | 0.03 | 0.001 | 0.001 | 0.01 | 0.01 | 0.01 | 0.01 | 0.0001 | 0.004 | 0.265 |
| Commercial Material 4 | 0.08 | 0.8 | 1.6 | | | | | | | | | | | | 0.180 |
| Commercial Material 5 | 0.18 | 1.2 | 1.5 | 0.008 | 0.001 | 0.03 | 0.001 | 0.001 | 0.01 | 0.01 | 0.01 | 0.01 | 0.0001 | 0.003 | 0.319 |
| Commercial Material 6 | 0.169 | 1.35 | 2.0 | 0.012 | 0.0012 | | 0.002 | 0.006 | | 0.03 | 0.01 | | | | 0.353 |
| Commercial Material 7 | 0.14 | 0.5 | 1.7 | 0.008 | 0.0011 | 0.03 | 0.001 | 0.052 | 0.01 | 0.02 | 0.01 | 0.01 | 0.0001 | 0.003 | 0.272 |
| Commercial Material 8 | 0.03 | 0.3 | 0.8 | | | 0.03 | | | 8.8 | 17.9 | 0.08 | | | | 0.078 |

Figure 8:
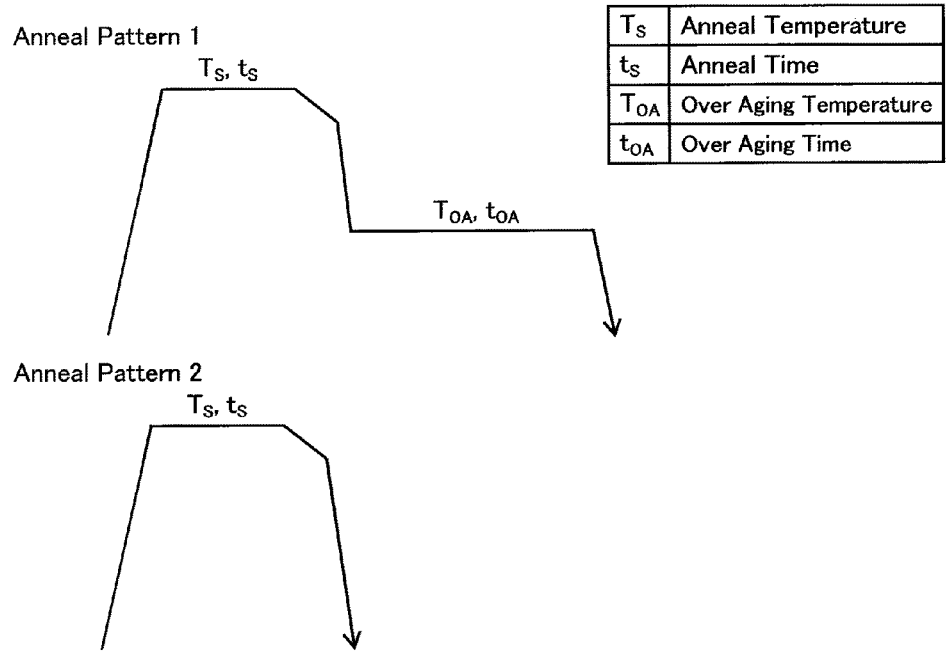
FIG. 8 shows an annealing pattern formed on a slab in the examples.

Then, the Slabs 1 to 8 were subjected to rolling and anneal under conditions shown in Table 2, and Invented steel sheets 1 to 7 and Comparative steel sheet 1 of which characteristics were out of the invented range were produced by changing process conditions. The annealing pattern including heating temperature, timing of change of heating temperature, maintaining time for heating, and the like was pattern 1 or pattern 2 shown in FIG. 8, and each pattern was performed on each slab. Commercial materials 1 to 8 of which compositions are shown in Table 1 are shown in Table 2 as Comparative steel sheets 2 to 9 of which characteristics were out of the invented range. Since the Comparative steel sheets 2 to 9 were commercial materials, for which production conditions were not known, production conditions in the Comparative steel sheets 2 to 9 are not shown in Table 2. Annealed structures, and the like in Invented steel sheets 1 to 7 and Comparative steel sheets 1 to 9 are shown in Table 3.

TABLE 2

| | | Production Condition | | | | | |
|---|---|---|---|---|---|---|---|
| | Composition Symbol | Reduction % | Anneal Pattern | Anneal Temperature Ts ° C. | Anneal Time ts sec | Cooling After Anneal | Over Aging Time ToA | Over Aging Temperature toA |
| Invented Steel Sheet 1 | Slab 1 | 80 | 2 | 700 | 120 | WQ | — | — |
| Invented Steel Sheet 2 | Slab 2 | 83 | 2 | 675 | 120 | WQ | — | — |
| Invented Steel Sheet 3 | Slab 3 | 83 | 1 | 675 | 120 | OA | 400 | 300 |
| Invented Steel Sheet 4 | Slab 4 | 70 | 2 | 700 | 120 | WQ | — | — |
| Invented Steel Sheet 5 | Slab 5 | 71 | 2 | 700 | 120 | WQ | — | — |
| Invented Steel Sheet 6 | Slab 6 | 75 | 2 | 675 | 120 | WQ | — | — |
| Invented Steel Sheet 7 | Slab 7 | 71 | 1 | 725 | 120 | OA | 400 | 300 |
| Comparative Steel Sheet 1 | Slab 8 | 75 | 1 | 780 | 120 | OA | 400 | 300 |
| Comparative Steel Sheet 2 | Commercial Material 1 | | | | | | | |
| Comparative Steel Sheet 3 | Commercial Material 2 | | | | | | | |
| Comparative Steel Sheet 4 | Commercial Material 3 | | | | | | | |
| Comparative Steel Sheet 5 | Commercial Material 4 | | | | | | | |
| Comparative Steel Sheet 6 | Commercial Material 5 | | | | | | | |
| Comparative Steel Sheet 7 | Commercial Material 6 | | | | | | | |
| Comparative Steel Sheet 8 | Commercial Material 7 | | | | | | | |
| Comparative Steel Sheet 9 | Commercial Material 8 | | | | | | | |

WQ: Water Quenching
OA: Self-cooling

TABLE 3

| | | Annealed Structure | | | | | | |
|---|---|---|---|---|---|---|---|---|
| | | | | Ferrite Phase | | | | |
| | Composition Symbol | Main Phase | Second Phase | Nano Ferrite Ratio % | Average Particle Diameter ds (Nano) | Average Particle Diameter dL (Micro) | dL/ds | Average Area Ratio of Second Phase A(ave) % |
| Base | | F | M, B, A | 15~90 | | | ≧3.0 | 30~70 |
| Invented Steel Sheet 1 | Slab 1 | F | M | 57 | 0.57 | 1.98 | 3.5 | 30 |
| Invented Steel Sheet 2 | Slab 2 | F | M | 88 | 0.70 | 2.20 | 3.1 | 37 |
| Invented Steel Sheet 3 | Slab 3 | F | M, B, A | 87 | 0.45 | 1.54 | 3.4 | 43 |
| Invented Steel Sheet 4 | Slab 4 | F | M, A | 88 | 0.52 | 1.75 | 3.4 | 36 |
| Invented Steel Sheet 5 | Slab 5 | F | M, A | 86 | 0.51 | 1.67 | 3.3 | 42 |
| Invented Steel Sheet 6 | Slab 6 | F | M, A | 88 | 0.50 | 1.64 | 3.3 | 43 |
| Invented Steel Sheet 7 | Slab 7 | F | B, A | 86 | 0.67 | 2.25 | 3.4 | 64 |
| Comparative Steel Sheet 1 | Slab 8 | F | B, A | 0 | — | 3.55 | — | 33 |
| Comparative Steel Sheet 2 | Commercial Material 1 | F | C, P | 0 | — | 12.3 | — | 4 |
| Comparative Steel Sheet 3 | Commercial Material 2 | F | M | 1 | 0.95 | 5.50 | 5.8 | 7 |

TABLE 3-continued

| | Composition Symbol | Main Phase | Second Phase | Nano Ferrite Ratio % | Average Particle Diameter ds (Nano) | Average Particle Diameter dL (Micro) | dL/ds | Average Area Ratio of Second Phase A(ave) % |
|---|---|---|---|---|---|---|---|---|
| Comparative Steel Sheet 4 | Commercial Material 3 | F | B, A | 0 | — | 5.69 | — | 18 |
| Comparative Steel Sheet 5 | Commercial Material 4 | F | M | 1 | 0.74 | 2.63 | 3.6 | 10 |
| Comparative Steel Sheet 6 | Commercial Material 5 | F | B, A | 1 | 0.99 | 4.97 | 5.0 | 24 |
| Comparative Steel Sheet 7 | Commercial Material 6 | F | M | 4 | 0.89 | 2.35 | 2.6 | 25 |
| Comparative Steel Sheet 8 | Commercial Material 7 | F | M | 0 | — | 1.46 | — | 99 |
| Comparative Steel Sheet 9 | Commercial Material 8 | A | — | 0 | — | 20.00 | — | — |

F: Ferrite
A: Retained Austenite
M: Martensite
B: Bainite
C: Cementite
P: Pearlite Metallic structures (ferrite, retained austenite, martensite, bainite, cementite, and pearlite) were discriminated in the following manner. That is, a rolled steel sheet was cut along a cross section parallel to the rolling direction of the steel sheet, and the cross section was etched with a solution of nitric acid and ethanol. Then, the cross section was observed by a scanning electron microscope and was photographed at a magnification ratio of 5000, whereby a secondary electronic image (hereinafter referred to as "SEM image photograph") was obtained and the structure was observed and evaluated.

Average area ratio of the hard second phase and area ratio of the nanograins (nanoferrite) in the ferrite portion except for the hard second phase were measured from a SEM image photograph. Proportion (dL/ds) of the average particle size ds of the nanoferrite and the average particle size dL of the microferrite of which the particle size was on the order of microns was obtained. It should be noted that the nanoferrite is a grain having a grain size of 1.2 μm or less and the micronferrite is a grain having a size of more than 1.2 μm. The average grain size corresponds to a diameter of a circle measured from each area of ferrite grains, all of which are measured by image analysis. Specifically, when the area of ferrite grains measured by image analysis is defined as Si (i=1, 2, 3, ... ), the diameter of a circle Di (i=1, 2, 3, ... ) is calculated from $(Di=2(Si/3.14)^{1/2})$. The results of the calculation are shown in Table 3.

Figure 9:
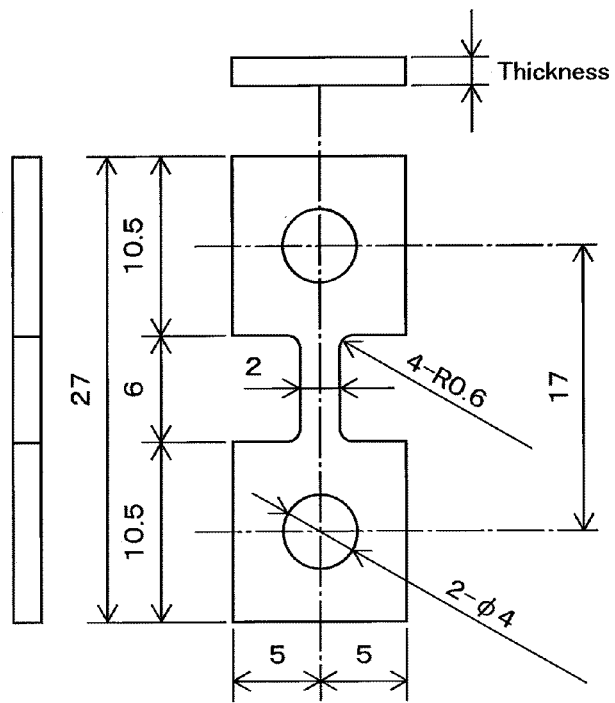
FIG. 9 shows a shape of a test piece which was used in a tensile test in the examples.

Next, a dumb-bellshaped tensile test piece as shown in FIG. 9 was cut from the Invented steel sheets 1 to 7 and Comparative steel sheets 1 to 9 such that the direction of tensile stress is parallel to the rolling direction. Tensile tests were performed on the tensile test pieces, a stress-strain diagram was obtained, and yield point (YP) and tensile strength (TS) were obtained, and true stress at 3% of true strain, true stress at 7% of true strain, gradient dσ/dε of the stress-strain diagram in 3 to 7% of true strain, n value in 3 to 7% of true strain, n value in 5 to 15% of true strain, and total elongation (t-El) were obtained from the stress-strain diagram. The values are shown in Table 4.

TABLE 4

| | Composition Symbol | Yield Point (YP) MPa | Tensile Strength (TS) MPa | True Stress in 3% of True Strain MPa | True Stress in 7% of True Strain MPa | Stress Gradient (3-7%) MPa | n Value (3-7%) | n Value (5-15%) | Total Elongation (t-El) % |
|---|---|---|---|---|---|---|---|---|---|
| | Base | | | | | ≧5000 | | | |
| Invented Steel Sheet 1 | Slab 1 | 806 | 918 | 730 | 939 | 5219 | 0.297 | 0.187 | 24 |
| Invented Steel Sheet 2 | Slab 2 | 974 | 1176 | 968 | 1174 | 5152 | 0.228 | 0.222 | 25 |
| Invented Steel Sheet 3 | Slab 3 | 757 | 1580 | 1282 | 1646 | 9114 | 0.295 | 0.081 | 18 |
| Invented Steel Sheet 4 | Slab 4 | 698 | 1072 | 751 | 977 | 5641 | 0.310 | 0.282 | 28 |
| Invented Steel Sheet 5 | Slab 5 | 698 | 1072 | 782 | 1055 | 6835 | 0.310 | 0.282 | 28 |
| Invented Steel Sheet 6 | Slab 6 | 841 | 1264 | 880 | 1180 | 7497 | 0.346 | 0.305 | 25 |

TABLE 4-continued

| | | Material Characteristics | | | | | | | |
|---|---|---|---|---|---|---|---|---|---|
| | Composition Symbol | Yield Point (YP) MPa | Tensile Strength (TS) MPa | True Stress in 3% of True Strain MPa | True Stress in 7% of True Strain MPa | Stress Gradient (3-7%) MPa | n Value (3-7%) | n Value (5-15%) | Total Elongation (t-El) % |
| Invented Steel Sheet 7 | Slab 7 | 537 | 1176 | 964 | 1207 | 6079 | 0.265 | 0.159 | 21 |
| Comparative Steel Sheet 1 | Slab 8 | 461 | 747 | 594 | 710 | 2911 | 0.211 | 0.240 | 38 |
| Comparative Steel Sheet 2 | Commercial Material 1 | 284 | 421 | 370 | 434 | 1605 | 0.189 | 0167 | 38 |
| Comparative Steel Sheet 3 | Commercial Material 2 | 350 | 563 | 553 | 659 | 2651 | 0.207 | 0.187 | 30 |
| Comparative Steel Sheet 4 | Commercial Material 3 | 445 | 657 | 518 | 611 | 2315 | 0.194 | 0.212 | 33 |
| Comparative Steel Sheet 5 | Commercial Material 4 | 431 | 727 | 673 | 771 | 2447 | 0.160 | 0.058 | 26 |
| Comparative Steel Sheet 6 | Commercial Material 5 | 483 | 837 | 732 | 857 | 3142 | 0196 | 0.242 | 25 |
| Comparative Steel Sheet 7 | Commercial Material 6 | 745 | 1017 | 1000 | 1089 | 2229 | 0.101 | 0.027 | 16 |
| Comparative Steel Sheet 8 | Commercial Material 7 | 1231 | 1290 | 1320 | 1253 | −1675 | — | — | 8 |
| Comparative Steel Sheet 9 | Commercial Material 8 | 287 | 624 | 372 | 456 | 2084 | 0.238 | 0.338 | 49 |

FIG. 1 shows nominal stress-nominal strain diagrams of Invented steel sheet 4 and Comparative steel sheet 7 as typical examples of a stress-strain diagram in the invented steel sheets and the comparative steel sheets. According to FIG. 1, in the invented steel sheet, large work hardening properties was specifically obtained in a range of 10% or less of strain.

Figure 3:
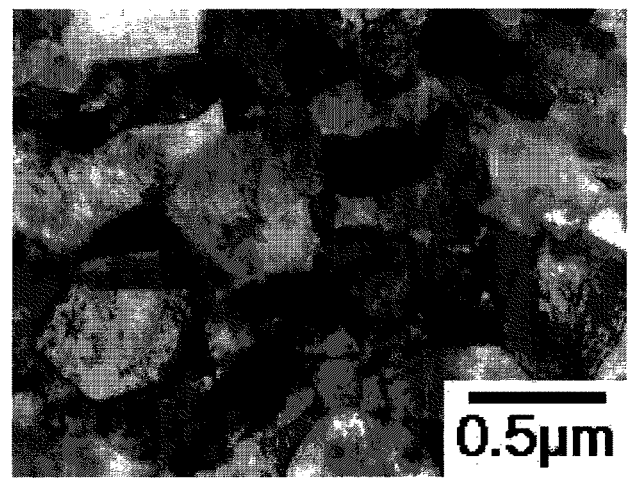
FIG. 3 is a photograph of an internal structure after tensile deformation of the invented steel sheet in the example.
Figure 4:
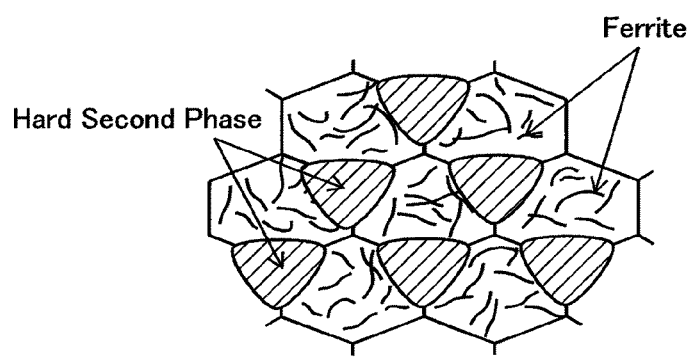
FIG. 4 is a schematic drawing of FIG. 3

FIG. 3 shows a bright field image of a film obtained from Invented steel sheet 4 as mentioned before. That is, a tensile test piece was made from Invented steel sheet 4 such that the direction of tensile stress coincided with the rolling direction. After the tensile test, a film was obtained from a parallel portion of the tensile test piece such that the observation face was a cross section parallel to the tensile direction, that is, the rolling direction, and the film was observed by a transmission electron microscope (TEM). FIG. 4 is a schematic drawing of the field image. According to FIGS. 3 and 4, a hard second phase, which is a dark portion as a whole, and ferrite of a matrix, which is a relatively bright portion, are mixed. Dislocations exist at very high density in the ferrite of the matrix. The dislocations do not form dislocation cell structures that are generally observed in a deformed metal structure.

Figure 10:
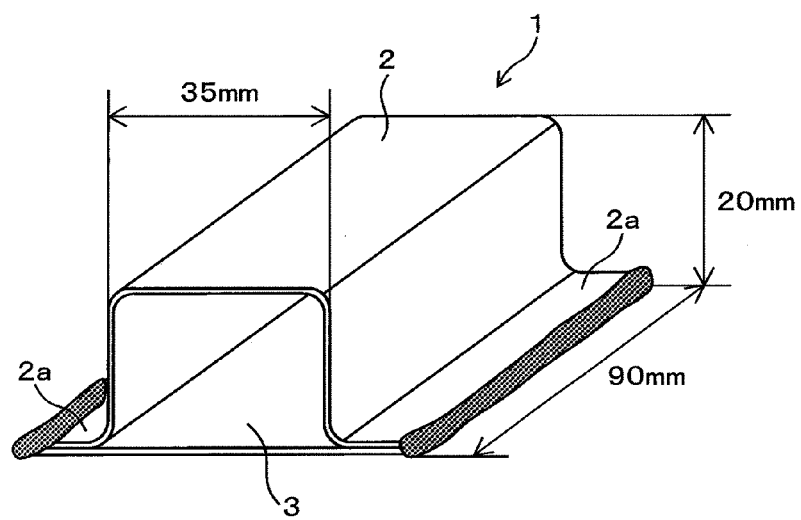
FIG. 10 shows a schematic view of a tubular member (model for TIG welding) used for a crushing test in the example.
Figure 11:
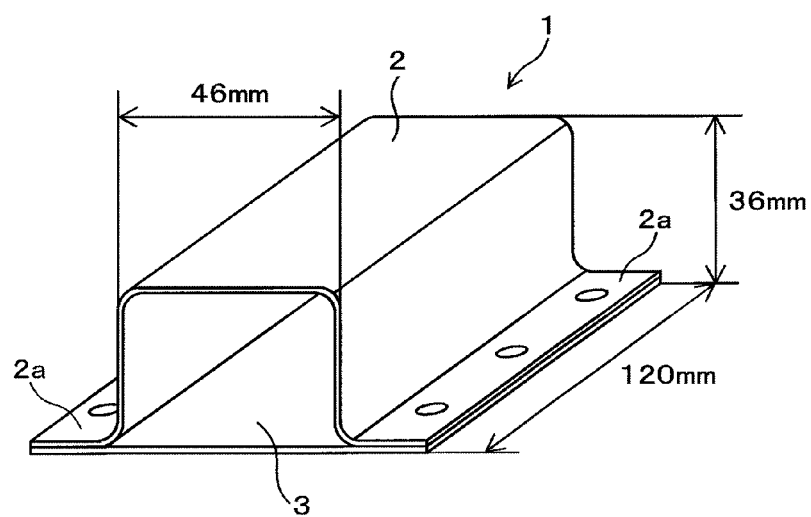
FIG. 11 shows a schematic view of a tubular member (model for spot welding) used for a crushing test in the example.

Next, tubular members 1 (invented member and comparative member) shown in FIG. 10 and FIG. 11 were formed as test pieces from Invented steel sheets 1 to 7 and Comparative steel sheets 1 to 9. The tubular member 1 was produced such that a steel sheet was bent to form a hat portion 2 having flanges 2*a*, and a back board 3 is welded to the flange 2*a*, thereby forming a tube, and was assumed to be a part of a vehicle frame (strength member for a vehicle). Four rectangular corner portions of the hat portion 2 were formed by bending with a punch having a radius of 5 mm. In the tubular member 1 shown in FIG. 10, the flange 2*a* and the back board 3 was welded by TIG welding. In the tubular member 1 shown in FIG. 11, the flange 2*a* and the back board 3 were welded by spot welding (3 points each). Sizes are shown in FIGS. 10 and 11 and there are small differences in sizes of the TIG welding model (shape A) and the spot welding model (shape B).

Figure 12:
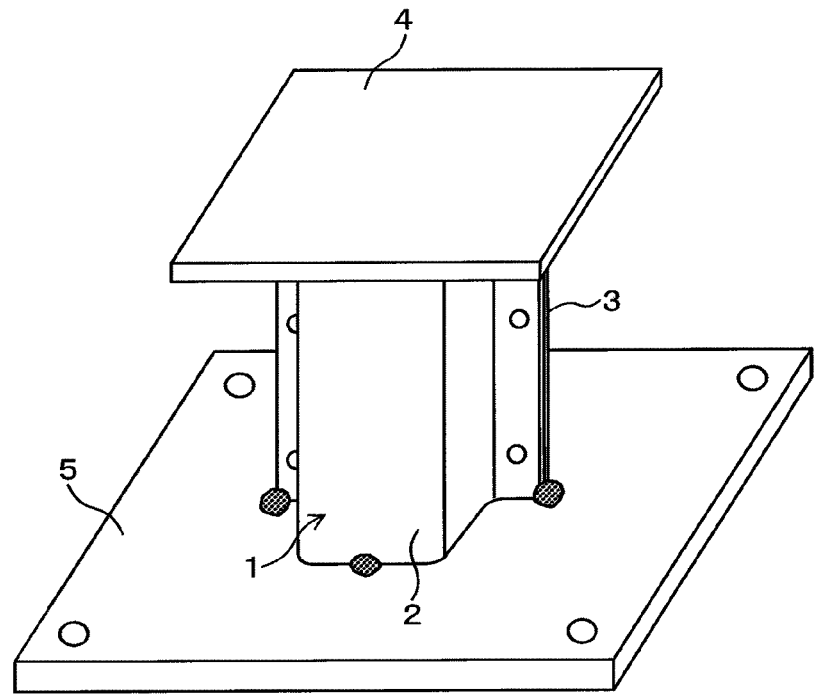
FIG. 12 shows a schematic view of a test body made of a tubular member used for a crushing test.

After producing tubular members 1 of the TIG welding model and the spot welding model as mentioned above from Invented steel sheets 1 to 7 and Comparative steel sheets 1 to 9, as shown in FIG. 12 (the tubular member 1 in FIG. 12 was a spot welding model), a top board 4 and a ground board 5 were welded to the tubular member 1 by TIG welding, and a crushing test body was produced. The top board 4 and the ground board 5 were square steel plates, and the area of the ground board 5 was larger than that of the top board 4. The tubular member 1 was disposed at the center portion of the top board 4 and the ground board 5.

Figure 13:
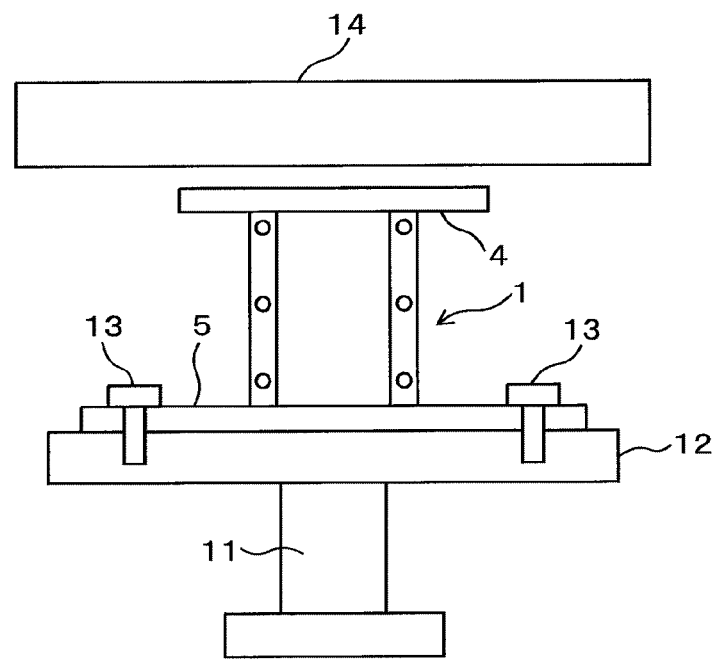
FIG. 13 is a side view showing a condition in which a test body is provided to a free-fall drop impact test.

Each crushing test body was subjected to a crushing test. The crushing test was performed by an apparatus for free-fall drop impact testing as shown in FIG. 13, in which four corners of the ground board 5 were bolted to a base plate 12 supported by a load cell 11, thereby vertically supporting the tubular member 1. In the crushing test, a falling weight 14 dropped from the upper side, and the tubular member 1 was crushed from above. The weight of the falling weight 14 was about 100 kg, the falling height was 11 m, and the falling speed at impact was 50 km/h. The crushing stroke (difference of the total length of the tubular member 1 before crushing and the total length of the tubular member 1 after crushing), and the load in crushing were measured. Furthermore, the absorbed energy and the initial resistance were measured and the condition of the buckling deformation was observed.

Table 5 shows the absorbed energy when the crushing stroke was 60 mm, the initial resistance, and the condition of the buckling deformation with respect to the selected test body (invented members 1 to 3 and Comparative members 1 to 9). In the item "Shape of member" in Table 5, "A" is the TIG model and "B" is the spot welding model.

TABLE 5

| | | | | Crushing Performance | | |
|---|---|---|---|---|---|---|
| | Steel Sheet Symbol | Shape of Member | Method for Welding | Absorbed Energy 60 mm kJ | Initial Reaction kN | Condition of Deformation |
| Invented Member 1 | Invented Steel Sheet 1 | A | TIG | 2.35 | 120 | Cornice |
| Invented Member 2 | Invented Steel Sheet 4 | A | TIG | 2.45 | 117 | Cornice |
| Invented Member 3 | Invented Steel Sheet 4 | B | SPOT | 2.19 | 146 | Cornice |
| Comparative Member 1 | Comparative Steel Sheet 3 | A | TIG | 1.58 | 97 | Cornice |
| Comparative Member 2 | Comparative Steel Sheet 4 | A | TIG | 1.69 | 111 | Cornice |
| Comparative Member 3 | Comparative Steel Sheet 6 | A | TIG | 1.94 | 134 | Cornice |
| Comparative Member 4 | Comparative Steel Sheet 2 | B | SPOT | 1.23 | 112 | Cornice |
| Comparative Member 5 | Comparative Steel Sheet 3 | B | SPOT | 1.64 | 139 | Cornice |
| Comparative Member 6 | Comparative Steel Sheet 5 | B | SPOT | 1.76 | 144 | Cornice |
| Comparative Member 7 | Comparative Steel Sheet 7 | B | SPOT | 2.25 | 185 | Cornice |
| Comparative Member 8 | Comparative Steel Sheet 8 | B | SPOT | 2.43 | 209 | Bending |
| Comparative Member 9 | Comparative Steel Sheet 9 | B | SPOT | 1.21 | 87 | Cornice |

Figure 14:
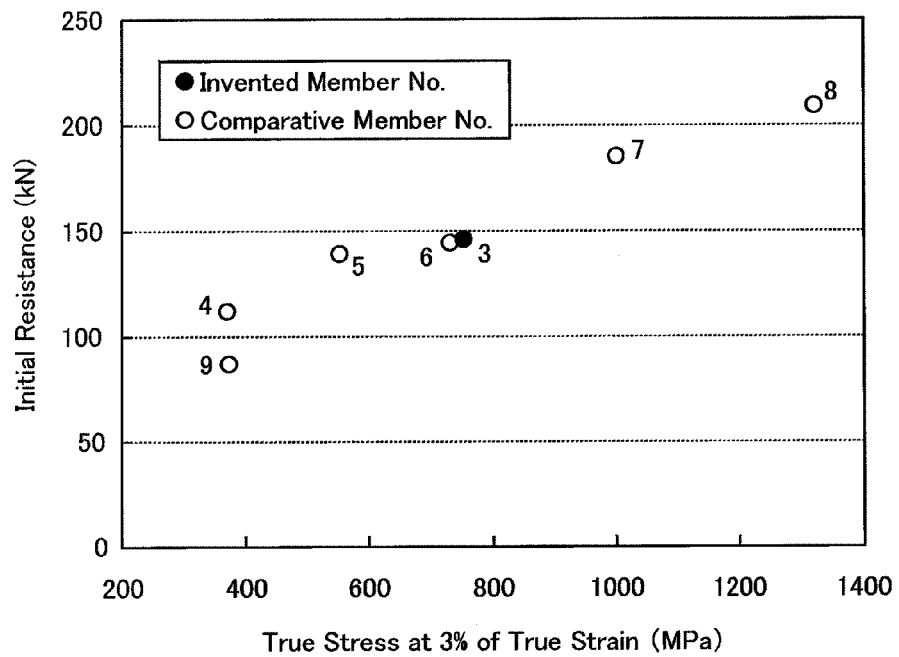
FIG. 14 is a graph showing a relationship between the deformation stress at 3% of true strain obtained by the tensile test and the initial resistance measured in the crushing test in Example 1.
Figure 15:
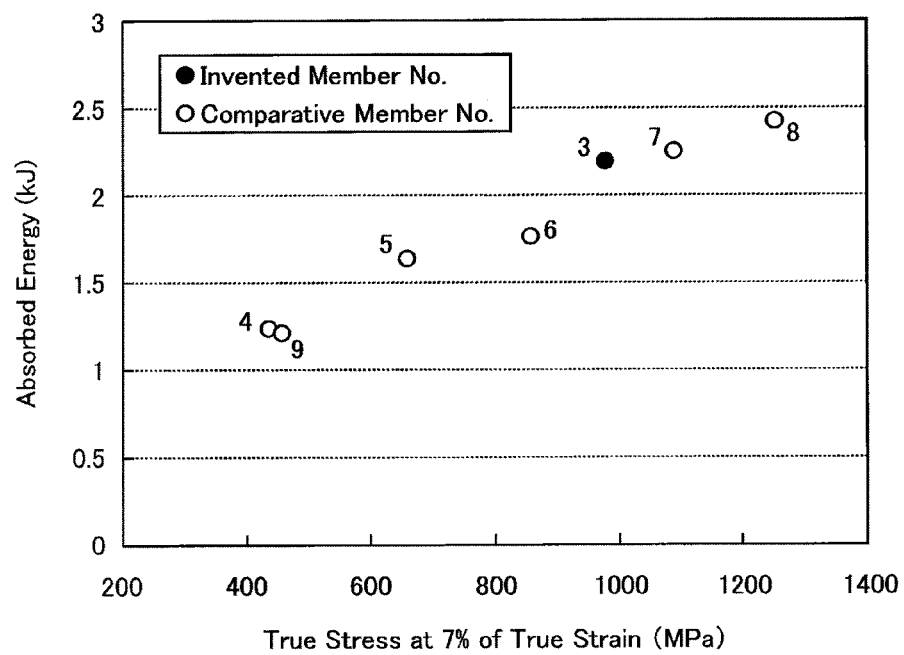
FIG. 15 is a graph showing a relationship between the deformation stress at 7% of true strain obtained by the tensile test and the absorbed energy measured in the crushing test in Example 1.

FIG. 14 shows a relationship between deformation stress at 3% of strain in the tensile test and initial resistance measured in the crushing test with respect to Invented member 3 and Comparative members 4 to 9. FIG. 15 shows a relationship between deformation stress at 7% of strain in the tensile test and absorbed energy measured in the crushing test in which the crushing stroke was up to 60 mm with respect to Invented member 3 and Comparative members 4 to 9. FIGS. 14 and 15 show a correlation and that the initial resistance is decided by 3% of deformation stress and absorbed energy is decided by 7% of deformation stress. This means that if differences in both stresses, that is, the gradient of stress, is large, small initial resistance and large absorbed energy can be obtained. Thus, the technical concept of the present invention is verified.

Figure 16:
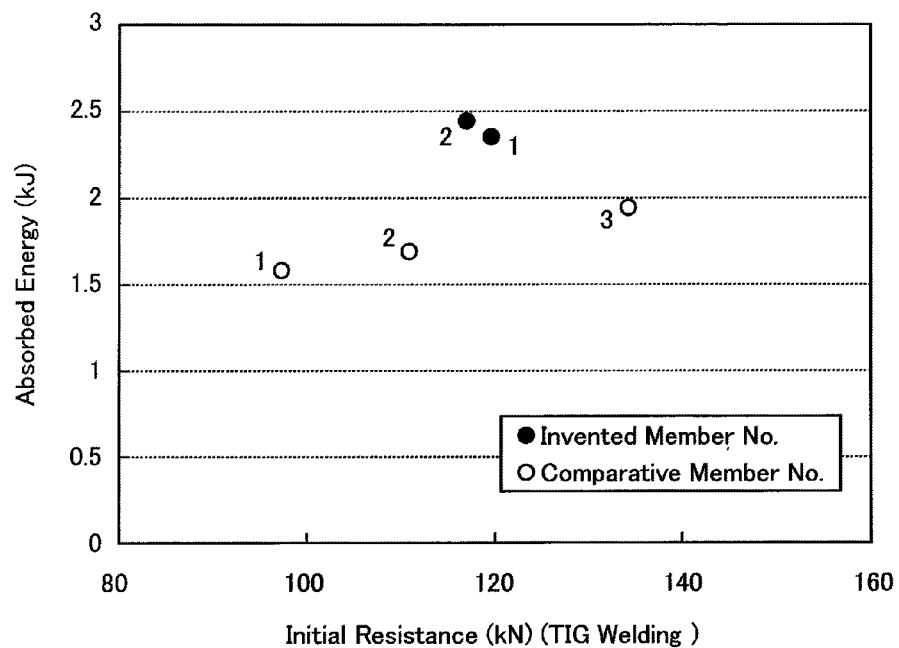
FIG. 16 is a graph showing a relationship between the initial resistance and the absorbed energy measured in the crushing test in Example 1 with respect to the invention member and the comparative member in the TIG welding model.
Figure 17:
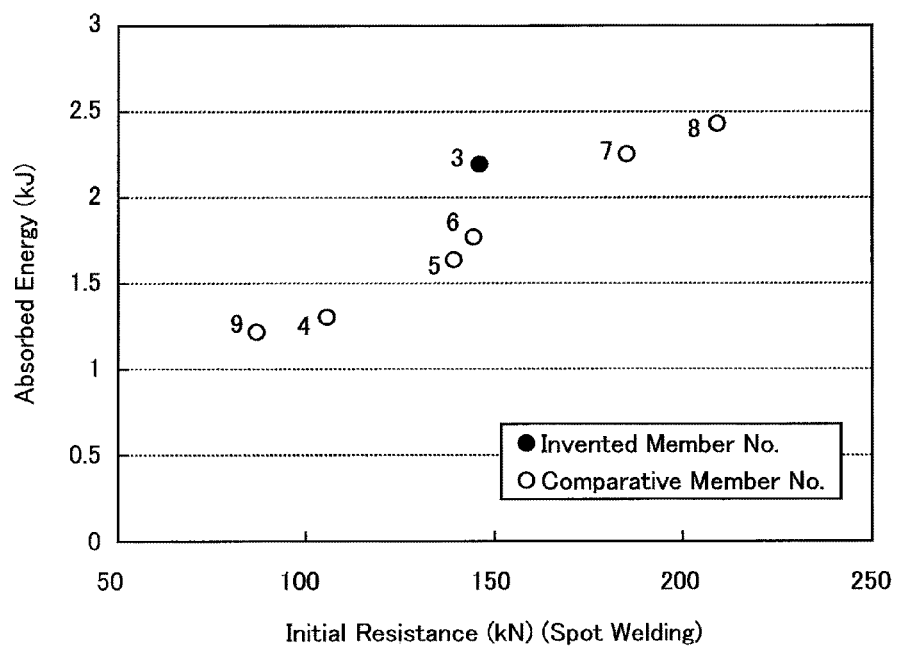
FIG. 17 is a graph showing a relationship between the initial resistance and the absorbed energy measured in the crushing test in Example 1 with respect to the invention member and the comparative member in the spot welding model.

FIG. 16 shows a relationship between initial resistance and absorbed energy measured in the crushing test in which the crushing stroke was up to 60 mm with respect to Invented member 1 and Comparative members 1 to 3 of the TIG welding model (shape A). FIG. 17 shows a relationship between initial resistance and absorbed energy measured in the crushing test in which the crushing stroke was up to 60 mm with respect to Invented member 3 and Comparative members 4 to 9 of the spot welding model (shape B). As shown in FIGS. 16 and 17, although the absorbed energy in the invented member was higher or equal to that of the comparative member, the initial resistance in the present invention was lower or equal to that of the comparative member. This result shows that the balance of the initial resistance and the absorbed energy in the present invention is good.

Figure 18:
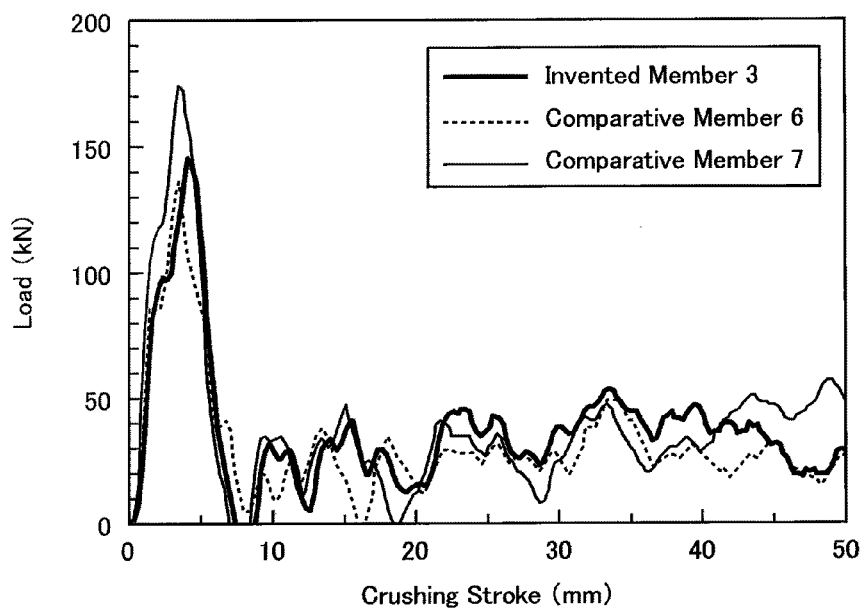
FIG. 18 is a graph showing a relationship between the crushing stroke and the crushing load measured in the crushing test in Example 1.
Figure 19:
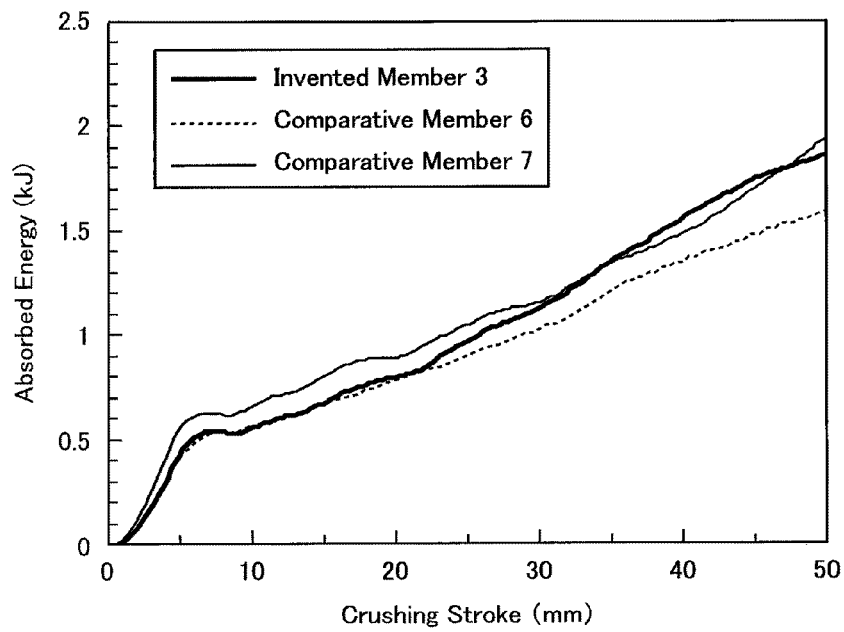
FIG. 19 is a graph showing a relationship between the crushing stroke and the absorbed energy measured in the crushing test in Example 1.

FIG. 18 shows a relationship between crushing stroke and crushing load measured in the crushing test with respect to Invented member 3 and Comparative member 6 and 7, and FIG. 19 shows a relationship between crushing stroke and absorbed energy with respect to these members. In FIG. 18, initial resistance in which the load rapidly increased occurred before the crushing stroke reached 5 mm; then increase and decrease of the load in a lower level continued, and this shows buckling occurred, forming an accordion shape.

As shown in FIG. 18, the initial resistance of Comparative member 6 was low and the absorbed energy of Comparative member 6 was also low as shown in FIG. 19. In Comparative member 7, both the absorbed energy and the initial resistance were high. Therefore, impact resistance properties in which low initial resistance and high absorbed energy are preferable in Comparative members 6 and 7 were unbalanced for one of the properties.

In contrast, in Invented member 3, the initial resistance was low and the absorbed energy was high and satisfied conflicting properties. For example, Comparative member 6 needed a crushing stroke of about 40 mm to absorb 1.5 kJ. However, in Invented member 3, it was sufficient to have 30 mm or slightly more of crushing stroke. Since the initial resistances of Invented member 3 and Comparative member 6 were the same, Invented member 3 was more improved in impact absorption properties than Comparative member 6. In Comparative member 7, although about the same absorbed energy as in Invented member 3 was obtained in a crushing stroke of 30 mm, the initial resistance was high, and the overall properties of the comparative member were deteriorated compared to the invented member.

Thus, the strength member composed of the steel sheet of the present invention has superior impact resistance properties, which have not been obtained in conventional high-strength steel sheets. That is, the present invention balances conflicting properties in which initial resistance is low and absorbed energy is high. Therefore, when the invented steel sheet is applied to strength members for a vehicle such as a front frame of a vehicle, advantages for constructing the vehicle such as reducing the weight of a vehicle body and improvement in driving performance by shortening of front overhang can be obtained.

Example 2

In Example 2, an example of a steel sheet having relatively high C equivalent of 0.4 or more is explained. Slabs 9 to 16 were ingoted by vacuum melting. Compositions of the Slabs 9 to 16 are shown in Table 6. The balance other than the elements shown in Table 6 is Fe.

TABLE 6

| | Composition (wt %) | | | | | | | | | | | | | | Ceq Base ≧ 0.4 | Judgment |
|---|---|---|---|---|---|---|---|---|---|---|---|---|---|---|---|---|
| | C | Si | Mn | P | S | Al | Nb | Ti | Ni | Cr | Mo | V | B | N | | |
| Slab 9 | 0.31 | 1.38 | 1.6 | 0.004 | 0.003 | 0.01 | 0.02 | 0.002 | 1.94 | | | | | 0.002 | 0.447 | OK |
| Slab 10 | 0.30 | 1.41 | 3.0 | 0.002 | 0.002 | 0.03 | 0.001 | | 0.21 | | | | | 0.001 | 0.497 | OK |
| Slab 11 | 0.30 | 1.39 | 3.0 | 0.056 | 0.0012 | 0.02 | 0.017 | | 0.01 | | | | | 0.002 | 0.711 | OK |
| Slab 12 | 0.39 | 1.41 | 1.57 | 0.004 | 0.002 | 0.013 | 0.02 | | 1.94 | | 0.01 | | 0.0001 | 0.003 | 0.524 | OK |
| Slab 13 | 0.40 | 1.4 | 1.5 | 0.05 | 0.002 | 0.03 | 0.02 | 0.005 | 2.04 | | | | | 0.003 | 0.714 | OK |
| Slab 14 | 0.40 | 1.5 | 1.4 | 0.056 | 0.002 | 0.02 | 0.02 | 0.004 | 0.02 | 0.01 | 0.01 | 0.01 | 0.0002 | 0.011 | 0.736 | OK |
| Slab 15 | 0.30 | 1.4 | 1.5 | 0.002 | 0.002 | 0.02 | 0.001 | | 0.2 | | | | | 0.003 | 0.422 | OK |
| Slab 16 | 0.19 | 1.5 | 1.5 | 0.005 | 0.0014 | 0.04 | 0.00 | | | | | | | 0.002 | 0.325 | NG |
| Commercial Material 9 | 0.09 | 0.0 | 1.3 | 0.012 | 0.0046 | | | | | | | | | | 0.212 | NG |
| Commercial Material 10 | 0.09 | 0.8 | 1.6 | 0.009 | 0.0022 | 0.04 | 0.001 | 0.001 | 0.01 | 0.02 | 0.01 | 0.01 | 0.0002 | 0.003 | 0.230 | NG |
| Commercial Material 11 | 0.12 | 1.3 | 1.5 | 0.008 | 0.0025 | 0.03 | 0.001 | 0.001 | 0.01 | 0.01 | 0.01 | 0.01 | 0.0001 | 0.004 | 0.265 | NG |
| Commercial Material 12 | 0.08 | 0.8 | 1.6 | | | | | | | | | | | | 0.180 | NG |
| Commercial Material 13 | 0.18 | 1.2 | 1.5 | 0.008 | 0.001 | 0.03 | 0.001 | 0.001 | 0.01 | 0.01 | 0.01 | 0.01 | 0.0001 | 0.003 | 0.319 | NG |
| Commercial Material 14 | 0.169 | 1.35 | 2.0 | 0.012 | 0.0012 | | 0.002 | 0.006 | | 0.03 | 0.01 | | | | 0.353 | NG |
| Commercial Material 15 | 0.14 | 0.5 | 1.7 | 0.008 | 0.0011 | 0.03 | 0.001 | 0.052 | 0.01 | 0.02 | 0.01 | 0.01 | 0.0001 | 0.003 | 0.272 | NG |
| Commercial Material 16 | 0.03 | 0.3 | 0.8 | | | 0.03 | | | 8.8 | 17.9 | 0.08 | | | | 0.078 | NG |

Then, the slabs 9 to 16 were subjected to rolling and anneal with conditions shown in Table 7, and Invented steel sheets 8 to 12 and Comparative steel sheets 10 to 12 were produced by changing process conditions. The annealing pattern including heating temperature, timing of change of heating temperature, holding time for heating, and the like was pattern 1 shown in FIG. 8. Commercial materials 9 to 16 for which compositions are shown in Table 6 are shown in Table 7 as Comparative steel sheets 13 to 20 of which characteristics were out the invented range. Since the Comparative steel sheets 13 to 20 are commercial materials, for which production conditions were not known, production conditions in the Comparative steel sheets 13 to 20 are not shown in Table 7. Annealed structures and the like in Invented steel sheets 8 to 12 and Comparative steel sheets 10 to 20 are shown in Table 8.

TABLE 7

| | | Production Condition | | | | | |
|---|---|---|---|---|---|---|---|
| | Composition Symbol | Reduction % | Anneal Pattern | Anneal Temperature Ts ° C. | Anneal Time ts sec | Cooling After Anneal | Over Aging Time ToA | Over Aging Temperature toA |
| Invented Steel Sheet 8 | Slab 9 | 71 | 1 | 725 | 120 | OA | 400 | 300 |
| Invented Steel Sheet 9 | Slab 10 | 75 | 1 | 700 | 120 | OA | 400 | 300 |
| Invented Steel Sheet 10 | Slab 11 | 71 | 1 | 700 | 120 | OA | 400 | 300 |
| Invented Steel Sheet 11 | Slab 12 | 71 | 1 | 725 | 120 | OA | 400 | 300 |
| Invented Steel Sheet 12 | Slab 13 | 71 | 1 | 725 | 120 | OA | 400 | 300 |
| Comparative Steel Sheet 10 | Slab 14 | 80 | 1 | 775 | 120 | OA | 400 | 300 |
| Comparative Steel Sheet 11 | Slab 15 | 75 | 1 | 780 | 120 | OA | 400 | 300 |
| Comparative Steel Sheet 12 | Slab 16 | 75 | 1 | 780 | 120 | OA | 400 | 300 |
| Comparative Steel Sheet 13 | Commercial Material 9 | | | | | | | |
| Comparative Steel Sheet 14 | Commercial Material 10 | | | | | | | |
| Comparative Steel Sheet 15 | Commercial Material 11 | | | | | | | |
| Comparative Steel Sheet 16 | Commercial Material 12 | | | | | | | |
| Comparative Steel Sheet 17 | Commercial Material 13 | | | | | | | |

TABLE 7-continued

| | | Production Condition | | | | | |
|---|---|---|---|---|---|---|---|
| | Composition Symbol | Reduction % | Anneal Pattern | Anneal Temperature Ts ° C. | Anneal Time ts sec | Cooling After Anneal | Over Aging Time ToA | Over Aging Temperature toA |
| Comparative Steel Sheet 18 | Commercial Material 14 | | | | | | | |
| Comparative Steel Sheet 19 | Commercial Material 15 | | | | | | | |
| Comparative Steel Sheet 20 | Commercial Material 16 | | | | | | | |

OA: Self-cooling

TABLE 8

| | | | Annealed Structure | | | | | |
|---|---|---|---|---|---|---|---|---|
| | | | | Ferrite Phase | | | | |
| | Composition Symbol | Main Phase | Second Phase | Nano Ferrite Ratio % | Average Particle Diameter ds (Nano) | Average Particle Diameter dL (Micro) | dL/ds | Average Area Ratio of Second Phase A(ave) % |
| | Base | F | M, B, A | 15~90 | | | ≧3.0 | 30~70 |
| Invented Steel Sheet 8 | Slab 9 | F | B, A | 78 | 0.73 | 2.38 | 3.3 | 48 |
| Invented Steel Sheet 9 | Slab 10 | F | B, A | 87 | 0.59 | 1.84 | 3.1 | 31 |
| Invented Steel Sheet 10 | Slab 11 | F | B, A | 86 | 0.55 | 1.83 | 3.3 | 54 |
| Invented Steel Sheet 11 | Slab 12 | F | B, A | 85 | 0.54 | 1.67 | 3.1 | 49 |
| Invented Steel Sheet 12 | Slab 13 | F | B, A | 82 | 0.48 | 1.56 | 3.3 | 53 |
| Comparative Steel Sheet 10 | Slab 14 | F | B, A | 6 | 0.78 | 2.57 | 3.3 | 38 |
| Comparative Steel Sheet 11 | Slab 15 | F | B, A | 1 | 0.90 | 3.86 | 4.3 | 42 |
| Comparative Steel Sheet 12 | Slab 16 | F | B, A | 0 | — | 3.55 | — | 33 |
| Comparative Steel Sheet 13 | Commercial Material 9 | F | C, P | 0 | — | 12.3 | — | 4 |
| Comparative Steel Sheet 14 | Commercial Material 10 | F | M | 1 | 0.95 | 5.50 | 5.8 | 7 |
| Comparative Steel Sheet 15 | Commercial Material 11 | F | B, A | 0 | — | 5.69 | | 18 |
| Comparative Steel Sheet 16 | Commercial Material 12 | F | B, A | 1 | 0.99 | 4.97 | 5.0 | 24 |
| Comparative Steel Sheet 17 | Commercial Material 13 | F | B, A | 1 | 0.99 | 4.97 | 5.0 | 24 |
| Comparative Steel Sheet 18 | Commercial Material 14 | F | M | 4 | 0.89 | 2.35 | 2.6 | 25 |
| Comparative Steel Sheet 19 | Commercial Material 15 | F | M | 0 | — | 1.46 | — | 99 |
| Comparative Steel Sheet 20 | Commercial Material 16 | A | — | 0 | — | 20.00 | — | — |

F: Ferrite
A: Retained Austenite
M: Martensite
B: Bainite
C: Cementite
P: Pearlite Metallic structures (ferrite, retained austenite, martensite, bainite, cementite, and pearlite) shown in Table 8 were discriminated by the same method as in Example 1.

Average area ratio of the hard second phase and area ratio of the nanograins (nanoferrite) in the ferrite portion except for the hard second phase were measured by the SEM image photograph with the same method as in Example 1. Proportion (dL/ds) of the average particle size ds of the nanoferrite and the average particle size dL of the microferrite of which particle size is on the order of microns was obtained. The results of the calculation are shown in Table 8.

Next, a dumb-bell-shaped tensile test piece was cut from the Invention steel sheets 8 to 12 and Comparative steel sheets 10 to 20 shown in Tables 7 and 8 such that the direction of tensile stress was parallel to the rolling direction. Tensile tests were performed on the tensile test piece, a stress-strain diagram was obtained, and yield point (YP), tensile strength (TS) were obtained, and true stress at 3% of true strain, true stress at 7% of true strain, gradient dσ/dε of the stress-strain diagram in 3 to 7% of true strain, n value in 3 to 7% of true strain, n value in 5 to 15% of true strain, and total elongation (t-El) were obtained from the stress-strain diagram. The values are shown in Table 9.

10 and FIG. 11 were formed as test pieces from Invented steel sheets 8 to 12 and Comparative steel sheets 10 to 20 shown in Tables 7 and 8 in the same way as in Example 1. In TIG welding, a welding rod YGT-50 regulated in JIS Z 3316 was used and welding current was about 20 A.

After producing the tubular members 1 of TIG welding model and spot welding model from Invented steel sheets 8 to

TABLE 9

| | | Material Characteristics | | | | | | |
|---|---|---|---|---|---|---|---|---|
| | Composition Symbol | Yield Point (YP) MPa | Tensile Strength (TS) MPa | True Stress in 3% of True Strain MPa | True Stress in 7% of True Strain MPa | Stress Gradient (3-7%) MPa | n Value (3-7%) | n Value (5-15%) | Total Elongation (t-El) % |
|---|---|---|---|---|---|---|---|---|---|
| Invented Steel Sheet 8 | Base Slab 9 | 514 | 1281 | 859 | 1190 | ≧5000 8279 | 0.385 | 0.309 | 21 |
| Invented Steel Sheet 9 | Slab 10 | 798 | 1028 | 756 | 981 | 5635 | 0.308 | 0.275 | 23 |
| Invented Steel Sheet 10 | Slab 11 | 470 | 1410 | 952 | 1290 | 8431 | 0.358 | 0.325 | 22 |
| Invented Steel Sheet 11 | Slab 12 | 706 | 1309 | 811 | 1120 | 7732 | 0.381 | 0.386 | 21 |
| Invented Steel Sheet 12 | Slab 13 | 666 | 1514 | 913 | 1312 | 9967 | 0.428 | 0.384 | 20 |
| Comparative Steel Sheet 10 | Slab 14 | 701 | 1178 | 844 | 1025 | 4520 | 0.229 | 0.294 | 35 |
| Comparative Steel Sheet 11 | Slab 15 | 539 | 875 | 681 | 804 | 3069 | 0.196 | 0.242 | 38 |
| Comparative Steel Sheet 12 | Slab 16 | 461 | 747 | 594 | 710 | 2911 | 0.211 | 0.240 | 38 |
| Comparative Steel Sheet 13 | Commercial Material 9 | 284 | 421 | 370 | 434 | 1605 | 0.189 | 0.167 | 38 |
| Comparative Steel Sheet 14 | Commercial Material 10 | 350 | 563 | 553 | 659 | 2651 | 0.207 | 0.187 | 30 |
| Comparative Steel Sheet 15 | Commercial Material 11 | 445 | 657 | 518 | 611 | 2315 | 0.194 | 0.212 | 33 |
| Comparative Steel Sheet 16 | Commercial Material 12 | 431 | 727 | 673 | 771 | 2447 | 0.160 | 0.058 | 26 |
| Comparative Steel Sheet 17 | Commercial Material 13 | 483 | 837 | 732 | 857 | 3142 | 0196 | 0.242 | 25 |
| Comparative Steel Sheet 18 | Commercial Material 14 | 745 | 1017 | 1000 | 1089 | 2229 | 0.101 | 0.027 | 16 |
| Comparative Steel Sheet 19 | Commercial Material 15 | 1231 | 1290 | 1320 | 1253 | −1675 | 0.160 | 0.058 | 8 |
| Comparative Steel Sheet 20 | Commercial Material 16 | 287 | 624 | 372 | 456 | 2084 | 0.238 | 0.338 | 49 |

Figure 2:
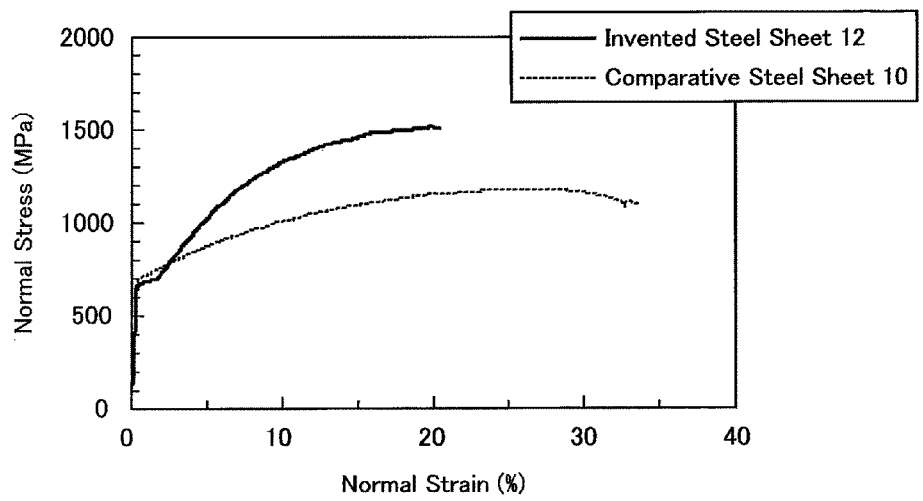
FIG. 2 shows nominal-stress-nominal-strain diagrams of the invented steel sheet and the comparative steel sheet produced in the example.

FIG. 2 shows nominal stress-nominal strain diagrams of Invented steel sheet 12 and Comparative steel sheet 10 as typical examples of a stress-strain diagram in the invented steel sheets and the comparative steel sheets. According FIG. 2, in the invented steel sheet, large work hardening properties were specifically obtained in a range of 10% or less of strain.

Figure 5:
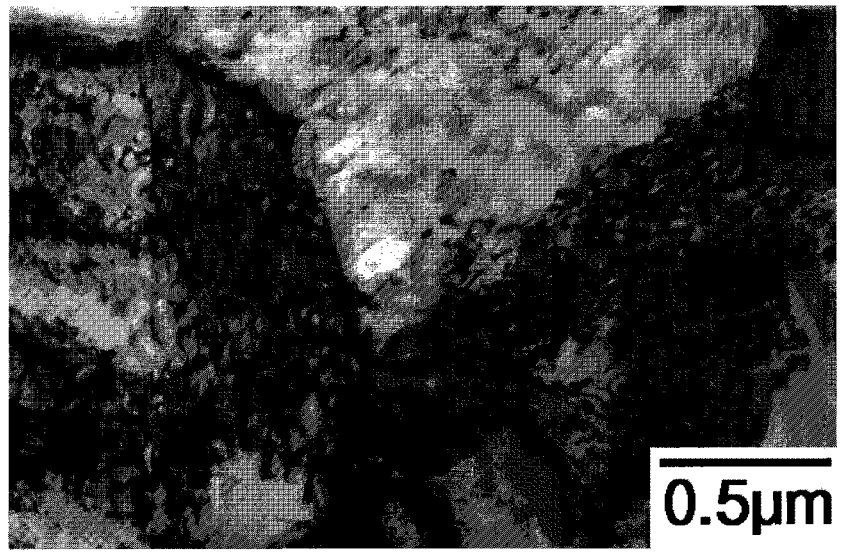
FIG. 5 is a photograph of an internal structure after tensile deformation of the invented steel sheet in the example.
Figure 6:
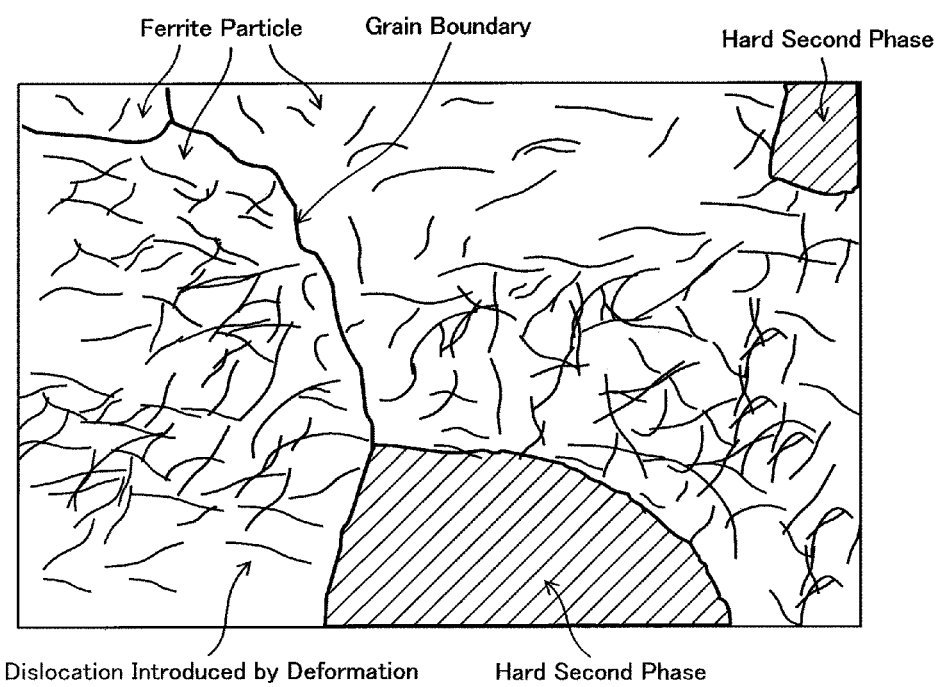
FIG. 6 is a schematic drawing of FIG. 5
Figure 7A:
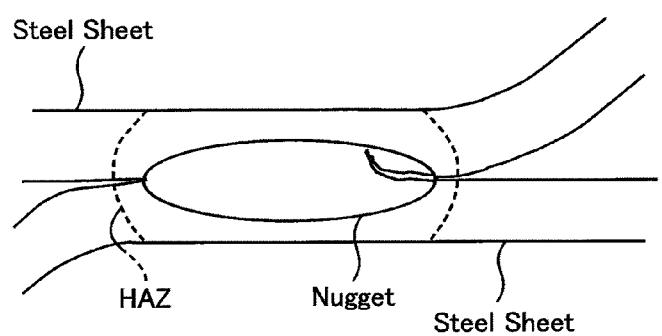
FIG. 7A is a cross section showing breakage conditions formed in a nugget and a heat-affected zone (HAZ) when tensile sharing is exerted on steel sheets connected by spot welding, and showing a case in which the HAZ is small, and 7B shows a case in which the HAZ is large as in the present invention.
Figure 7B:
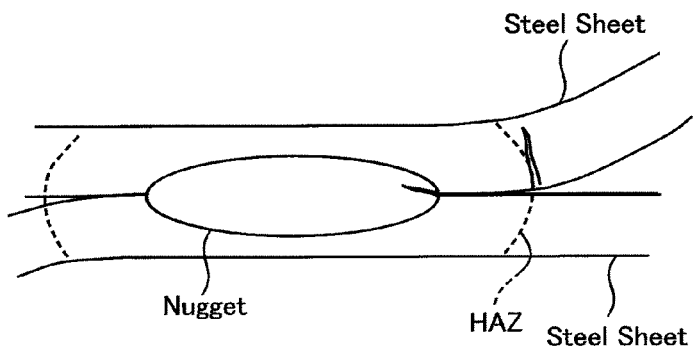

FIG. 5 shows a bright field image of a film obtained from Invented steel sheet 12 as mentioned before. That is, a tensile test piece was made from Invented steel sheet 12 such that the direction of tensile stress coincided with the rolling direction. After tensile testing, a film was obtained from a parallel portion of the tensile test piece such that the observation face was a cross section parallel to the tensile direction; that is, the rolling direction, and the film was observed by a transmission electron microscope (TEM). FIG. 6 is a schematic drawing of the field image. According to FIGS. 5 and 6, a hard second phase, which is a dark portion as a whole, and ferrite of a matrix, which is a relatively bright portion, are mixed. Dislocations exist at very high density in the ferrite of the matrix. The dislocations do not form dislocation cell structures which are generally observed in a deformed metal structure.

Next, tubular members 1 (invented member and comparative member) having rectangular cross section shown in FIG.

12 and Comparative steel sheets 10 to 20, crushing test bodies were produced using the tubular members 1 in the same way as in Example 1.

Each crushing test body was subjected to a crushing test. The crushing test was performed by an apparatus for free-fall drop impact testing as shown in FIG. 13. The conditions of the crushing test were the same as in Example 1. The crushing stroke (difference of the total length of the tubular member 1 before crushing and the total length of the tubular member 1 after crushing), and the load in crushing were measured. Furthermore, the absorbed energy and the initial resistance were measured and the condition of the buckling deformation was observed.

Table 10 shows the absorbed energy when the crushing stroke was 60 mm, the initial resistance, and the condition of the buckling deformation with respect to a test body formed from Invented member 4 consisting of Invented steel sheet 11, and test bodies formed from Comparative members 10 to 20 consisting of Invented steel sheet 11, Comparative steel sheets 10, and 13 to 20. In the item "Shape of member" in Table 10, "A" is the TIG model and "B" is the spot welding model. Invented member 4 was produced by spot welding and the below-mentioned welding conditions thereof were the same as that of Invented member 12 in Table 11. The welding conditions of Comparative member 11 were the same as that of Comparative member 39 in Table 12. Welding conditions of Comparative members 15 to 20 are shown in Table 10 and tempering energizing was not performed. It should be noted that Comparative member 11 was produced from Invented steel sheet 11. However, since the spot welding conditions in producing the tubular member 1 were out of the range of the present invention, Comparative member 11 was prepared.

In contrast, in Invented member 4, the initial resistance was low and the absorbed energy was high and satisfied conflicting properties. For example, Comparative member 18 needed a crushing stroke of about 40 mm to absorb 1.5 kJ. However, in Invented member 4, it was sufficient to have 30 mm or slightly more of crushing stroke. Since the initial resistances of Invented member 4 and Comparative member 18 were the same, Invented member 4 was more improved in impact absorption properties than Comparative member 18. In Comparative member 19, although about the same absorbed

TABLE 10

| | | Crushing Performance | | | | | |
|---|---|---|---|---|---|---|---|
| | Steel Sheet Symbol | Size of Cross Section | Method for Welding | Absorbed Energy 60 mm kJ | Initial Reaction kN | Condition of Deformation | Welding Condition |
| Invented Member 4 | Invented Steel Sheet 11 | B | SPOT | 2.40 | 177 | Cornice | Table 11 Invented Member 12 |
| Comparative Member 10 | Comparative Steel Sheet 10 | A | TIG | 1.43 | 121 | Breakage of Welded Portion | |
| Comparative Member 11 | Invented Steel Sheet 11 | B | SPOT | 1.92 | 177 | Breakage of Welded Portion | Table 12 Comparative Member 23 |
| Comparative Member 12 | Comparative Steel Sheet 14 | A | TIG | 1.58 | 97 | Cornice | |
| Comparative Member 13 | Comparative Steel Sheet 15 | A | TIG | 1.69 | 111 | Cornice | |
| Comparative Member 14 | Comparative Steel Sheet 17 | A | TIG | 1.94 | 134 | Cornice | |
| Comparative Member 15 | Comparative Steel Sheet 13 | B | SPOT | 1.23 | 112 | Cornice | 9.1 kA 0.36 sec |
| Comparative Member 16 | Comparative Steel Sheet 14 | B | SPOT | 1.64 | 139 | Cornice | 8.4 kA 0.36 sec |
| Comparative Member 17 | Comparative Steel Sheet 16 | B | SPOT | 1.76 | 144 | Cornice | 7.5 kA 0.4 sec |
| Comparative Member 18 | Comparative Steel Sheet 18 | B | SPOT | 2.25 | 185 | Cornice | 7.8 kA 0.4 sec |
| Comparative Member 19 | Comparative Steel Sheet 19 | B | SPOT | 2.43 | 209 | Bending | 8.2 kA 0.4 sec |
| Comparative Member 20 | Comparative Steel Sheet 20 | B | SPOT | 1.21 | 87 | Cornice | 7.6 kA 0.24 sec |

Figure 20:
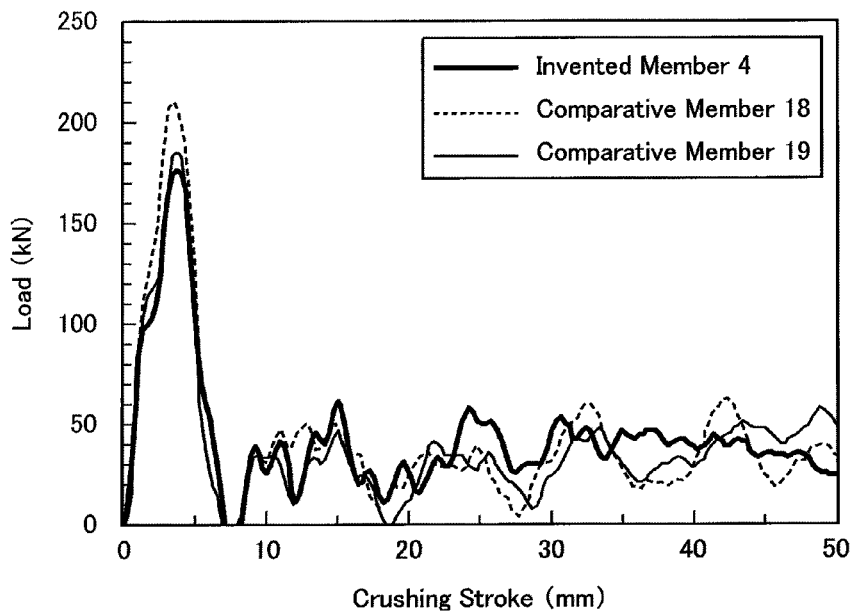
FIG. 20 is a graph showing a relationship between the crushing stroke and the crushing load measured in the crushing test in Example 2.
Figure 21:
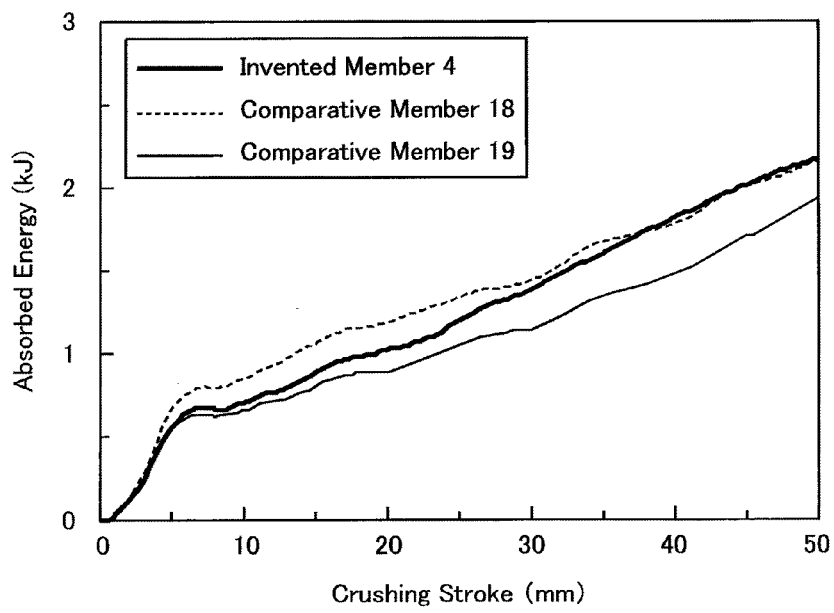
FIG. 21 is a graph showing a relationship between the crushing stroke and the absorbed energy measured in the crushing test in Example 2.

FIG. 20 shows a relationship between crushing stroke and crushing load measured in the crushing test with respect to Invented member 4 and Comparative member 18 and 19, and FIG. 21 shows a relationship between crushing stroke and absorbed energy with respect to these members. In FIG. 20, initial resistance in which the load rapidly increased occurred before the crushing stroke reached 5 mm, then increase and decrease of the load at a lower level continued, and this shows buckling occurred, forming an accordion shape.

As shown in FIG. 20, although the initial resistance of Invented member 4 was about the same as that of Comparative member 18, regarding the load after the crushing stroke exceeded 10 mm, Invented member 4 was high on average. This is because since work hardening of Invented member 4 was very high, the stress in the steel sheet was greatly increased by crushing. Regarding initial resistance, although Comparative member 18 was about the same as Invented member 4 and was low, Comparative member 18 was also low in absorbed energy, as shown in FIG. 21. Comparative member 19 was high in absorbed energy and initial resistance. Therefore, impact resistance properties in which low initial resistance and high absorbed energy are preferable in Comparative members 18 and 19 was unbalanced in one of the properties.

energy as Invented member 4 was obtained in a crushing stroke of 30 mm, the initial resistance was high, and total properties of the comparative member were inferior compared to the invented member.

As shown in Table 10, in Comparative member 19, buckling in a form of an accordion did not occur, but bending did occur. Since Comparative member 19 was produced from Comparative steel sheet 19 of which work hardening properties were extremely small, buckling was not stable. Therefore, when Comparative member 19 is applied to a strength member for a vehicle, the impact properties may easily vary. Furthermore, since the form of buckling is not compact in Comparative member 19, space for buckling is required around the member, and space efficiency is not good.

The results shown in Table 10 will be further explained. Comparative member 11 was produced from Inventive steel sheet 11 with spot welding for which conditions were outside those of the invention. In Comparative member 11, the initial resistance was about the same as that of Invented member 4 which was produced from the same steel sheet as in Comparative member 11 with spot welding of which conditions were within the invention. However, when deformation by crushing started, the weld portion was separated almost at the same time, whereby the absorbed energy was low. As a result, balance of the initial resistance and the absorbed energy was about the same level as the conventional steel sheets. In Comparative member 20, Commercial material 16 which was the material of Comparative steel sheet 20 is austenite stainless steel (SUS 304L). As shown in Table 9, although Comparative member 20 had a high n value of 0.338 at 5 to 15% of true strain, average gradient of stress was low at 2084 MPa. According to the results of the crush test, balance of the initial resistance and the absorbed energy was about the same level as for the conventional steel sheets.

Thus, the strength member composed of the steel sheet of the present invention has superior impact resistance properties which have not been obtained in the conventional high-strength steel sheets. That is, the present invention balances conflicting properties in which initial resistance is low and absorbed energy is high. Therefore, when the invented steel sheet is applied to strength members for a vehicle such as a front frame of a vehicle, advantages for constructing a vehicle such as reducing the weight of a vehicle body and improvement of driving performance by shortening of front overhang can be obtained.

Figure 22:
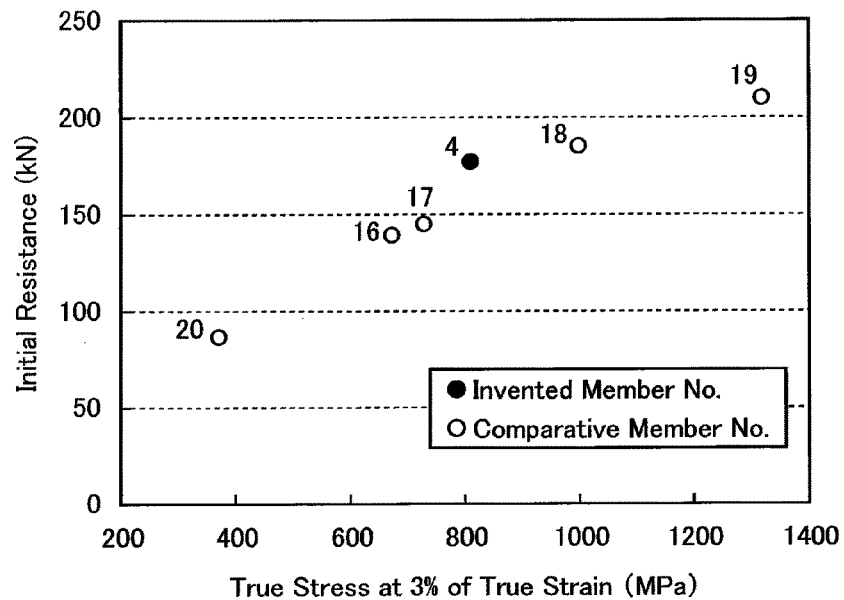
FIG. 22 is a graph showing a relationship between the deformation stress at 3% of true strain obtained by the tensile test and the initial resistance measured in the crushing test in Example 2.
Figure 23:
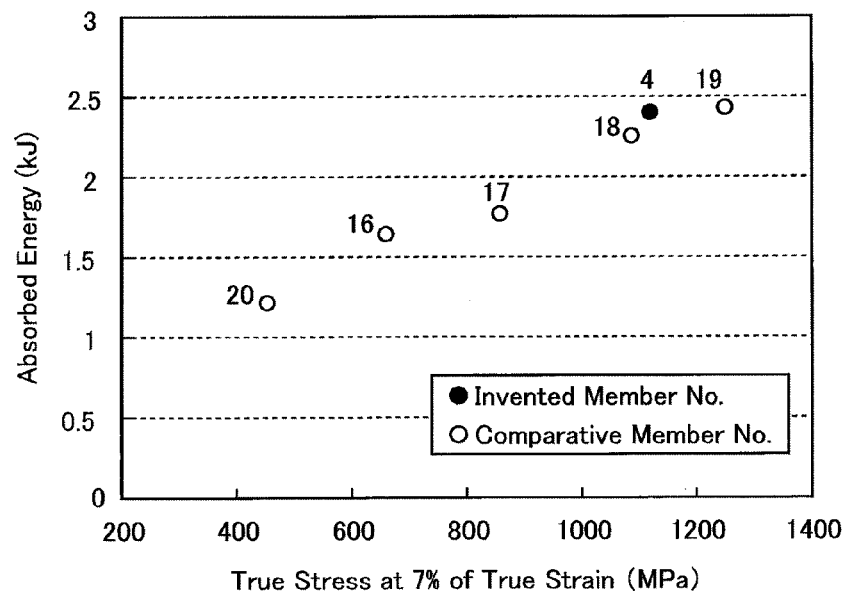
FIG. 23 is a graph showing a relationship between the deformation stress at 7% of true strain obtained by the tensile test and the absorbed energy measured in the crushing test in Example 2.

FIG. 22 shows a relationship between deformation stress at 3% of strain in the tensile test and initial resistance measured in the crushing test with respect to Invented member 4 and Comparative members 16 to 20 shown in Table 10. FIG. 23 shows a relationship between deformation stress at 7% of strain in the tensile test and absorbed energy measured in the crushing test in which the crushing stroke was up to 60 mm with respect to Invented member 4 and Comparative members 16 to 20. FIGS. 22 and 23 show a correlation and that the initial resistance is decided by 3% of deformation stress and absorbed energy is decided by 7% of deformation stress. This means that if differences of both stresses, that is, the gradient of stress, is large, small initial resistance and large absorbed energy can be obtained. Thus, the technical concept of the present invention is verified.

Figure 24:
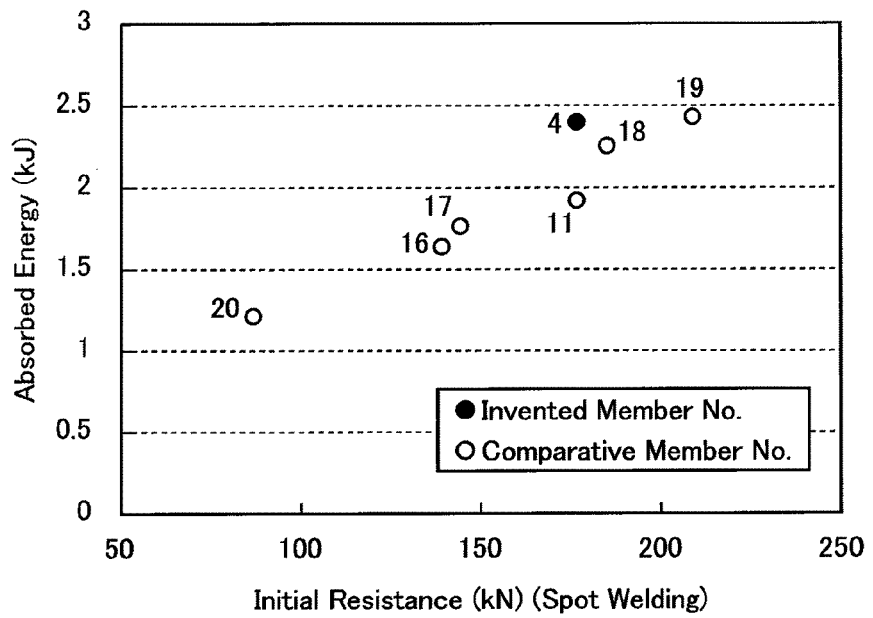
FIG. 24 is a graph showing a relationship between the initial resistance and the absorbed energy measured in the crushing test in Example 2 with respect to the invention member and the comparative member in the spot welding model.
Figure 25:
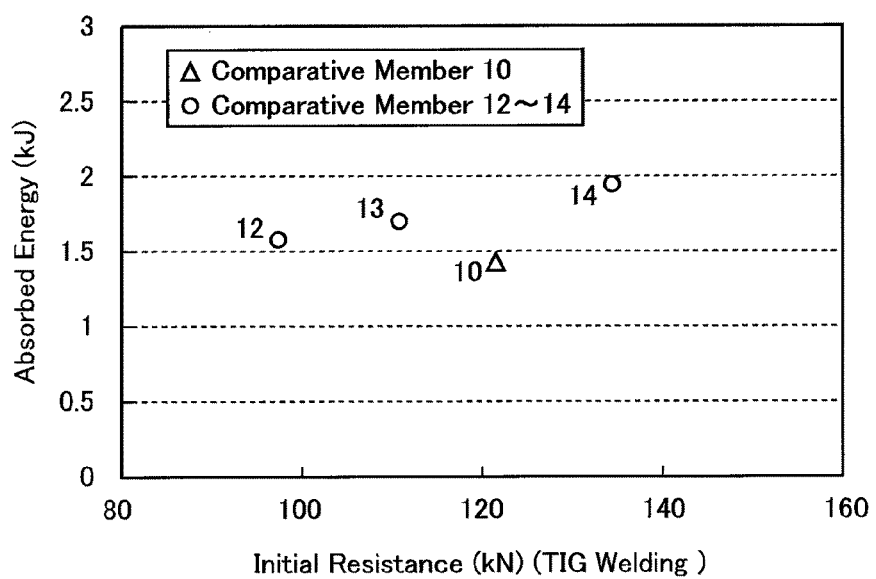
FIG. 25 is a graph showing a relationship between the initial resistance and the absorbed energy measured in the crushing test in Example 2 with respect to the invention member and the comparative member in the TIG welding model.

FIG. 24 shows a relationship between initial resistance and absorbed energy measured in the crushing test in which the crushing stroke was up to 60 mm with respect to Invented member 4 and Comparative members 11, 16 to 20 of the spot welding model (shape B). FIG. 25 shows a relationship between initial resistance and absorbed energy measured in the crushing test in which the crushing stroke was up to 60 mm with respect to Comparative members 10, 12 to 14 of the TIG welding model (shape A). As shown in FIG. 24, although the absorbed energy in the invented member was higher or equal to that of the comparative member, the initial resistance in the present invention was lower or equal to that of the comparative member. This result shows that balance of the initial resistance and the absorbed energy in the present invention is good. As shown in FIG. 25, balance of the initial resistance and the absorbed energy in Comparative member 10 of which C equivalent was 0.4 or more was especially bad in four examples of TIG welding. Other Comparative members 12, 13, and 14 correspond to Comparative steel sheets 14, 15, and 17, in which C equivalents were less than 0.4. That is, this result shows that it is difficult to use ordinary welding methods for steel sheets in which the C equivalent is 0.4 or more.

Next, Invented steel sheets 11 were welded according to spot welding conditions shown in Table 8, whereby Invented members 5 to 13 and Comparative members 21 to 36 were produced as samples for tempering energizing which was performed in spot welding. It should be noted that tempering energizing is performed such that energizing is continued at a current value in which a member is tempered at a predetermined temperature for a predetermined time after energizing for spot welding and is different from energizing for connecting.

TABLE 11

|  | Connecting Energizing | | | Temper Energizing | | | | Hardness of Center of Nugget Hv | Tensile Shear Strength kN |
| --- | --- | --- | --- | --- | --- | --- | --- | --- | --- |
|  | Current kA | Time cycle | Time sec | Current kA (I) | Time cycle | Time sec (t) | $It^2 \times t^{0.5}$ | | |
| Invented Member 5 | 7.64 | 12 | 0.24 | 4.74 | 50 | 1 | 22.5 | 563 | 13.0 |
| Invented Member 6 | 7.64 | 12 | 0.24 | 5.1 | 50 | 1 | 26.0 | 536 | 13.8 |
| Invented Member 7 | 7.64 | 12 | 0.24 | 5.21 | 50 | 1 | 27.1 | | 13.6 |
| Invented Member 8 | 7.64 | 12 | 0.24 | 5.33 | 50 | 1 | 28.4 | 523 | 14.8 |
| Invented Member 9 | 7.64 | 12 | 0.24 | 5.91 | 50 | 1 | 34.9 | | 13.7 |
| Invented Member 10 | 7.64 | 12 | 0.24 | 5.31 | 20 | 0.4 | 17.8 | | 12.4 |
| Invented Member 11 | 7.66 | 50 | 1 | 5.33 | 40 | 0.8 | 25.4 | 593 | 13.7 |
| Invented Member 12 | 7.66 | 50 | 1 | 5.33 | 50 | 1 | 28.4 | 588 | 15.9 |
| Invented Member 13 | 7.66 | 50 | 1 | 5.33 | 60 | 1.2 | 31.1 | 590 | 15.8 |
| Comparative Member 21 | 7.64 | 12 | 0.24 | 6.49 | 50 | 1 | 42.1 | 624 | 8.7 |
| Comparative Member 22 | 7.64 | 12 | 0.24 | 7.08 | 50 | 1 | 50.1 | | 11.2 |
| Comparative Member 23 | 7.64 | 12 | 0.24 | 7.68 | 50 | 1 | 59.0 | 614 | 11.8 |
| Comparative Member 24 | 7.64 | 12 | 0.24 | 8.26 | 50 | 1 | 68.2 | | 9.0 |
| Comparative Member 25 | 7.64 | 12 | 0.24 | 5.33 | 100 | 2 | 40.2 | | 10.4 |
| Comparative Member 26 | 7.64 | 12 | 0.24 | 5.33 | 150 | 3 | 49.2 | | 12.3 |
| Comparative Member 27 | 7.64 | 12 | 0.24 | 5.33 | 200 | 4 | 56.8 | | 10.9 |

TABLE 11-continued

| | Connecting Energizing | | | Temper Energizing | | | $I^2 \times t^{0.5}$ | Hardness of Center of Nugget Hv | Tensile Shear Strength kN |
|---|---|---|---|---|---|---|---|---|---|
| | Current kA | Time cycle | Time sec | Current kA (I) | Time cycle | Time sec (t) | | | |
| Comparative Member 28 | 7.64 | 12 | 0.24 | 7.1 | 100 | 2 | 71.3 | | 7.6 |
| Comparative Member 29 | 7.64 | 12 | 0.24 | 7.1 | 150 | 3 | 87.3 | | 8.8 |
| Comparative Member 30 | 7.64 | 12 | 0.24 | 8.18 | 20 | 0.4 | 42.3 | 640 | 9.1 |
| Comparative Member 31 | 7.64 | 12 | 0.24 | 9.32 | 20 | 0.4 | 54.9 | 627 | 6.7 |
| Comparative Member 32 | 7.64 | 12 | 0.24 | 8.85 | 50 | 1 | 78.3 | 617 | 12.2 |
| Comparative Member 33 | 7.64 | 12 | 0.24 | 7.1 | 200 | 4 | 100.8 | | 10.2 |
| Comparative Member 34 | 7.4 | 16 | 0.32 | 4 | 20 | 0.4 | 10.1 | 611 | 10.4 |
| Comparative Member 35 | 7.35 | 10 | 0.2 | 0 | 0 | 0 | 0 | 615 | 8.0 |
| Comparative Member 36 | 7.49 | 14 | 0.28 | 0 | 0 | 0 | 0 | 645 | 8.6 |

Figure 26:
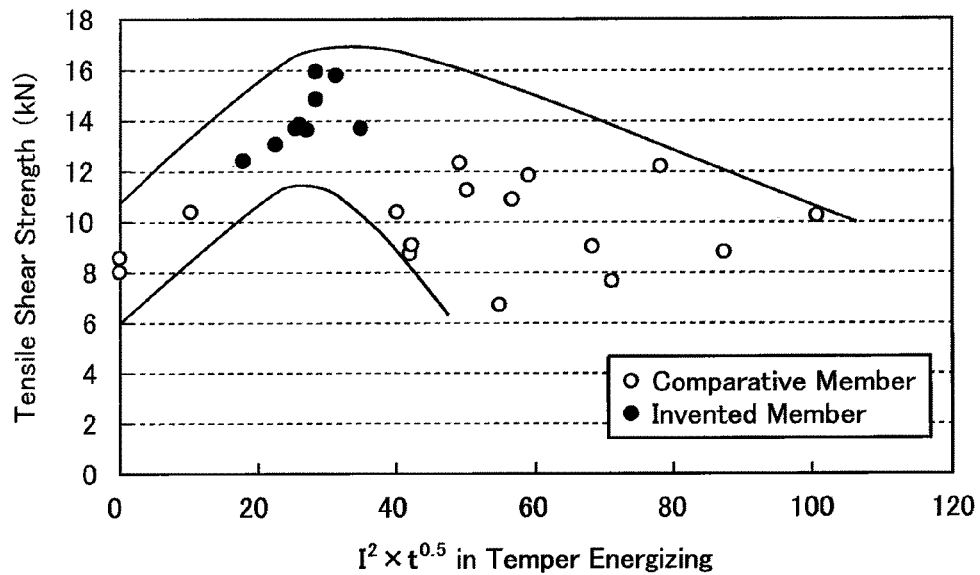
FIG. 26 is a graph showing a relationship between $I^2 \times t^{0.5}$ obtained by the temper energizing test and the tensile shear strength in Example 2.
Figure 27:
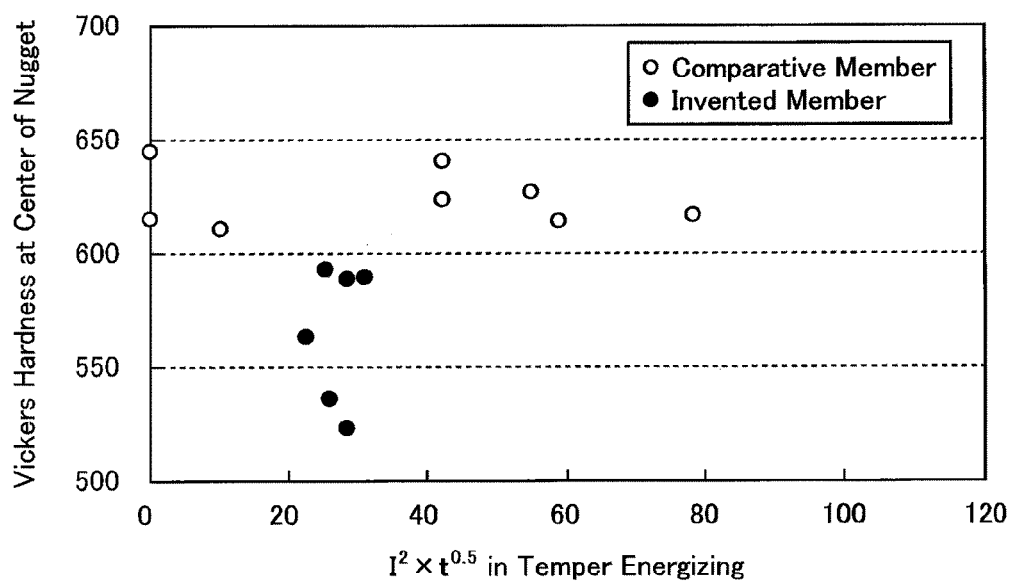
FIG. 27 is a graph showing a relationship between $I^2 \times t^{0.5}$ obtained by the temper energizing test and the Vickers hardness at the center of the nugget in Example 2.
Figure 28:
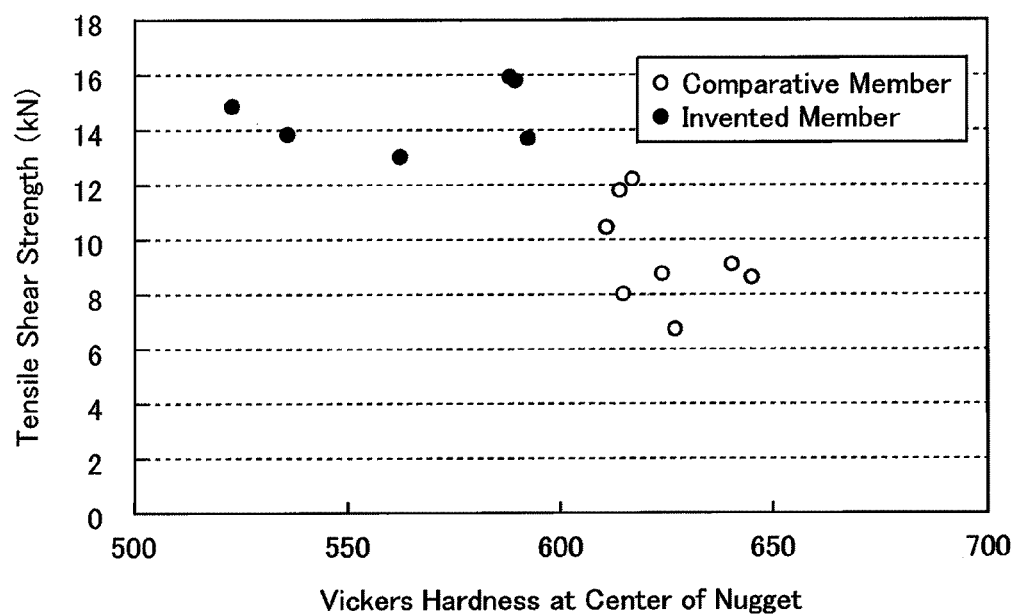
FIG. 28 is a graph showing a relationship between the Vickers hardness at the center of the nugget and the tensile shear strength in Example 2.

Tensile shear strength of Invented members 5 to 13 and Comparative members 21 to 36 were measured and Vickers hardnesses of the center portion of a nugget formed by spot welding in some samples selected from the members was measured. The results of the measurements are shown in Table 11 together. Relationships between "(temper energizing current I)$^2$×(temper energizing time t)$^{0.5}$, that is, $I^2 \times t^{0.5}$ and tensile shear strength is shown in FIG. 26. FIG. 27 shows a relationship between $I^2 \times t^{0.5}$ in temper energizing and Vickers hardness of the center portion of a nugget formed by spot welding. The present invention is characterized in that a Vickers hardness of the center portion of a nugget formed by spot welding is 60 or less. FIG. 28 shows a relationship between Vickers hardness of the center portion of a nugget and tensile shear strength.

According to FIG. 26, in the invented members of which $I^2 \times t^{0.5}$ was in a range of 20 to 40, the tensile shear strength was higher than that of the comparative members and reached 12 kN or more, and showed that the present invention is very advantageous in strength. According to FIG. 27, in the invented members of which $I^2 \times t^{0.5}$ was in a range of 20 to 40, Vickers hardness was 60 or less, and in all comparative members, Vickers hardness was more than 60. Therefore, when tempering energizing is performed in a condition of $20 \leq I^2 \times t^{0.5} \leq 40$, Vickers hardness is less than 600. As a result, high tensile shear strength over 12 kN can be stably obtained (see FIG. 28).

Figure 29:
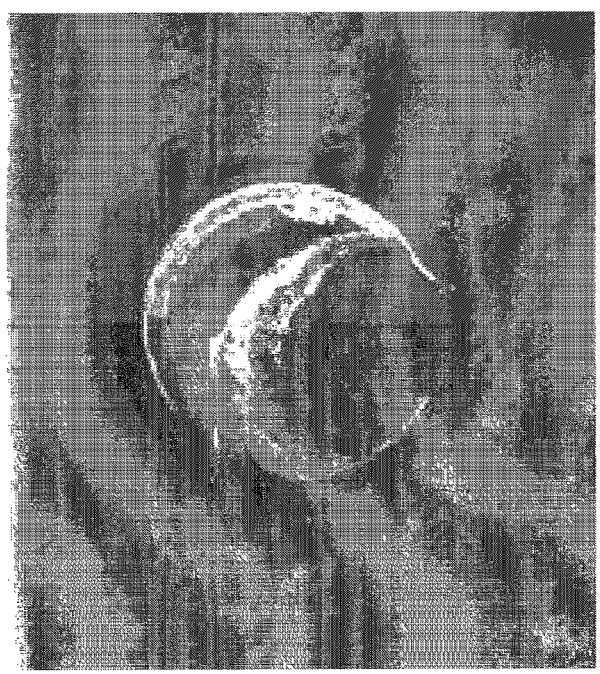
FIG. 29 is a photograph showing an appearance of a nugget of Invented member 8 shown in Table 11 after the tensile test.

FIG. 29 shows a photograph of the appearance of a nugget after a tensile test for Invention member 8 in Table 11. According to FIG. 29, the nugget was broken as a button and a crack reached the matrix around the nugget. This shows that toughness of the nugget was improved and the welding strength was high.

Figure 30:
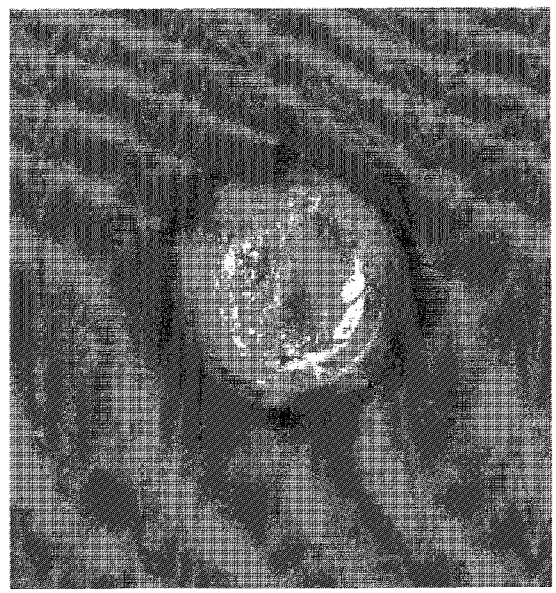
FIG. 30 is a photograph showing an appearance of a nugget of Comparative member 27 shown in Table 11 after the tensile test.

In contrast, FIG. 30 shows a photograph of the appearance of a nugget after tensile testing in Comparative member 27 in Table 11. In this case, sharing breakage occurred and the nugget did not remain. This may be because tempering brittleness appeared since tempering energizing time was long, whereby toughness of the nugget was reduced.

Figure 31:
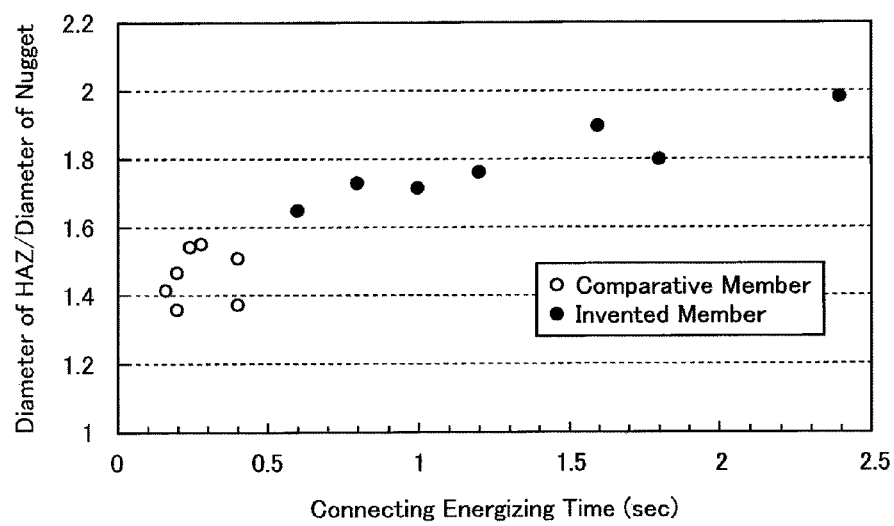
FIG. 31 is a graph showing a relationship between the connecting energizing time and the (diameter of HAZ)/(diameter of nugget) obtained in the connecting energizing test in Example 2.
Figure 32:
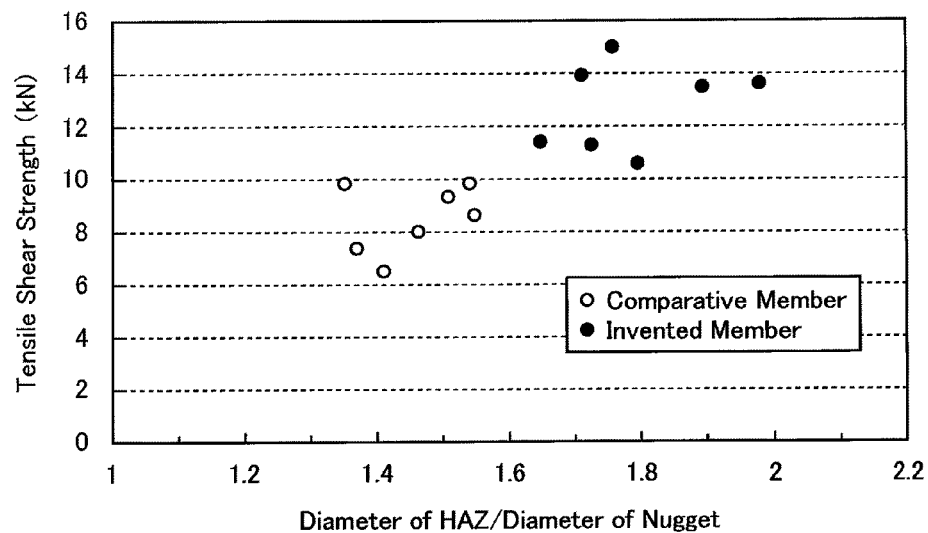
FIG. 32 is a graph showing a relationship between the (diameter of HAZ)/(diameter of nugget) and the tensile shear strength obtained in the connecting energizing test in Example 2.

Next, Invented steel sheet 11 shown in Table 7 was connected in the spot welding conditions (connecting energizing current and connecting energizing time) shown in Table 12, and Invented members 14 to 20 and Comparative members 37 to 43 as samples of connecting energizing test in which energizing conditions in connecting were varied. Diameter of the nugget, diameter of the HAZ, and tensile shear strength were measured and diameter of HAZ/diameter of nugget was obtained. The results are shown in Table 12 together, a relationship between the connecting energizing time and the diameter of HAZ/diameter of nugget is shown in FIG. 31, and a relationship between the diameter of HAZ/diameter of nugget and tensile shear strength are shown in FIG. 32.

TABLE 12

| | Connecting Energizing | | Diameter of Nugget | Diameter of HAZ | Diameter of HAZ/ Diameter of Nugget | Tensile Shear Strength |
|---|---|---|---|---|---|---|
| | Current kA | Time cycle / sec | mm | mm | | kN |
| Invented Member 14 | 7.61 | 30 / 0.60 | 5.06 | 8.34 | 1.65 | 11.4 |
| Invented Member 15 | 7.63 | 40 / 0.80 | 5.02 | 8.67 | 1.73 | 11.3 |
| Invented Member 16 | 7.64 | 50 / 1.00 | 5.12 | 8.76 | 1.71 | 13.9 |
| Invented Member 17 | 7.65 | 60 / 1.20 | 5.21 | 9.17 | 1.76 | 15.0 |
| Invented Member 18 | 7.65 | 80 / 1.60 | 4.88 | 9.25 | 1.90 | 13.5 |
| Invented Member 19 | 7.67 | 90 / 1.80 | 5.19 | 9.33 | 1.80 | 10.6 |

TABLE 12-continued

| | Connecting Energizing | | Diameter of Nugget | Diameter of HAZ | Diameter of HAZ/ Diameter of Nugget | Tensile Shear Strength |
| | Current kA | Time cycle | Time sec | mm | mm | | kN |
|---|---|---|---|---|---|---|---|
| Invented Member 20 | 7.67 | 120 | 2.40 | 4.80 | 9.5 | 1.98 | 13.6 |
| Comparative Member 37 | 7.78 | 8 | 0.16 | 4.85 | 6.85 | 1.41 | 6.5 |
| Comparative Member 38 | 7.35 | 10 | 0.20 | 5.02 | 7.34 | 1.46 | 8.0 |
| Comparative Member 39 | 7.44 | 12 | 0.24 | 5.10 | 7.86 | 1.54 | 9.8 |
| Comparative Member 40 | 7.49 | 14 | 0.28 | 5.18 | 8.03 | 1.55 | 8.6 |
| Comparative Member 41 | 7.38 | 10 | 0.20 | 5.96 | 8.07 | 1.35 | 9.8 |
| Comparative Member 42 | 7.58 | 20 | 0.40 | 6.46 | 8.85 | 1.37 | 7.4 |
| Comparative Member 43 | 7.56 | 20 | 0.40 | 5.03 | 7.58 | 1.51 | 9.3 |

According to FIG. 31, when the connecting energizing time was 0.6 seconds or more, the diameter of HAZ/diameter of nugget was 1.6 or more, that is, the diameter of the HAZ was 1.6 times the diameter of the nugget. According to FIG. 32, the invention members for which the diameter of HAZ/diameter of nugget was 1.6 or more had higher tensile shear strength than comparative members for which the diameter of HAZ/diameter of nugget was less than 1.6. Even if the connecting energizing time exceeds 2.5 seconds, the value of the diameter of HAZ/diameter of nugget may not further increase, and the tensile shear strength may be saturated. Therefore, it was confirmed that the connection energizing time is preferably 0.5 to 2.5 seconds.

Figure 33:
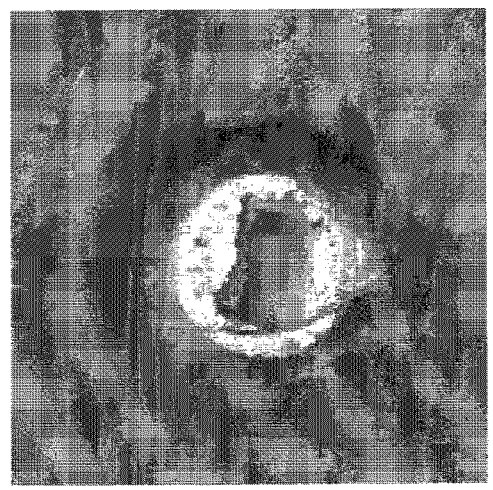
FIG. 33 is a photograph showing an appearance of a nugget of Invented member 18 shown in Table 12 after the tensile test.

FIG. 33 shows a photograph of the appearance of a nugget after tensile testing in Invented member 17 in Table 12. According to FIG. 33, HAZ which discolored by heating in welding was widely formed and cracks were transmitted from the nugget portion to the HAZ and extended toward the matrix, thereby having welding strength.

Figure 34:
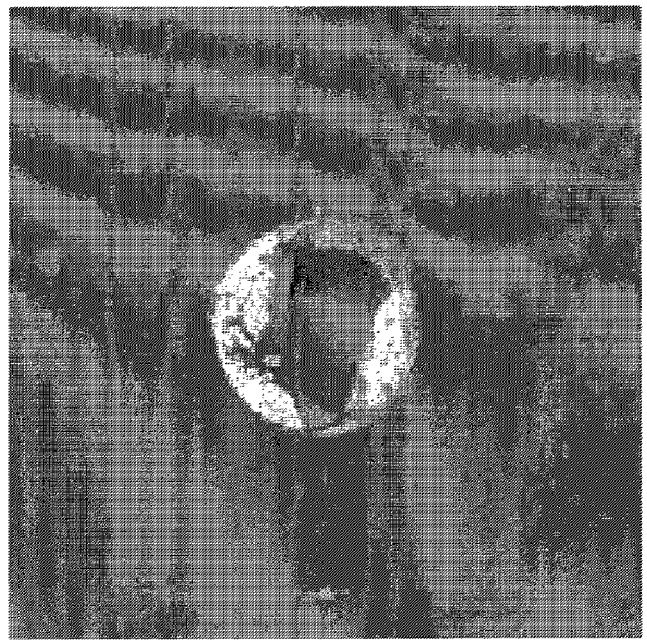
FIG. 34 is a photograph showing an appearance of a nugget of Comparative member 38 shown in Table 12 after the tensile test.

FIG. 34 shows a photograph of the appearance of a nugget after tensile testing in Comparative member 38 in Table 12. In this case, brittle breakage occurred only in the nugget. This shows that the welding strength, which is proportional to tensile shear strength, is lower than that of the invented member, as is clear from FIG. 32.

The invention claimed is:

1. A high-strength steel sheet comprising:
    a metallic structure consisting of a ferrite phase and a hard second phase dispersed in the ferrite phase;
    the hard second phase in the metallic structure having an area ratio of 30 to 70%; and
    the ferrite, of which grain sizes are not more than 1.2 μm, having an area ratio of 57 to 90% in the ferrite phase,
    wherein ds is an average grain size of the ferrite of which grain sizes are not more than 1.2 μm, dL is an average grain size of ferrite of which grain sizes are more than 1.2 μm, and ds and dL satisfy the following equation (1):

$$dL/ds > 3 \quad (1),$$ and in a stress-strain diagram obtained by a tensile test of the steel, gradient of stress on the stress-strain diagram, $d\sigma/d\epsilon$ in 3 to 7% of true strain is 5000 MPa or more.

2. A strength member for a vehicle comprising a high-strength steel sheet according to claim 1.

3. The strength member for a vehicle according to claim 2, wherein the strength member comprises two or more high-strength steel sheets, and the high-strength steel sheets are bonded to each other by electric resistance welding, laser welding, or arc welding.

4. The strength member for a vehicle according to claim 2, wherein the steel contains one or more elements of C, Mn, Si, P, and S, the elements satisfying the following equation (2), $$Ceq = C + Mn/20 + Si/40 + 4P + 2S \geq 0.4 \quad (2),$$

the strength member comprises two or more high-strength steel sheets,
the high-strength steel sheets are bonded to each other by spot resistance welding,
a weld nugget having a center is formed at a connecting portion of the high-strength steel sheets by a spot resistance welding, and
Vickers hardness of the center portion of the weld nugget is 600 or less.

5. The strength member for vehicle according to claim 2, wherein the steel contains one or more elements of C, Mn, Si, P, and S, the elements satisfying the following equation (2), $$Ceq = C + Mn/20 + Si/40 + 4P + 2S \geq 0.4 \quad (2),$$

the strength member comprises two or more high-strength steel sheets,
the high-strength steel sheets are bonded to each other by spot resistance welding,
a welding nugget and a heat-affected zone are formed at a connecting portion of the high-strength steel sheets by a spot resistance welding, and
the diameter of the heat-affected zone is 1.6 times or more the diameter of the welding nugget.

6. A production method for the strength member for vehicle recited in claim 4, wherein the spot resistance welding is performed by connecting welding followed by tempering energizing performed in the conditions
    current: I(kA)
    welding time: t(seconds), wherein I and t satisfy "$20 \leq I^2 \times t^{0.5} \leq 40$".

* * * * *